United States Patent [19]

Shima et al.

[11] Patent Number: 5,274,833
[45] Date of Patent: Dec. 28, 1993

[54] DATA-FLOW PROCESSOR HAVING TIMER CONTROL MECHANISM FOR EFFECTING TIME CONTROL PROCESSING BY CREATING OR INTRODUCING TIMER PACKET INTO DATA PATH

[75] Inventors: Kenji Shima; Shoichi Washino; Setsuhiro Shimomura; Yoshiaki Kanno, all of Hyogo, Japan

[73] Assignee: Mitsubishi Denki Kabushiki Kaisha, Tokyo, Japan

[21] Appl. No.: 647,710

[22] Filed: Jan. 28, 1991

[30] Foreign Application Priority Data

Jan. 31, 1990 [JP] Japan .................... 2-22780

[51] Int. Cl.⁵ .............................. G06F 13/00
[52] U.S. Cl. .................... 395/800; 395/550; 364/241.8; 364/DIG. 1; 340/825.06; 340/825.05
[58] Field of Search ............. 395/775, 400, 375, 800, 395/550; 340/825.06, 825.05

[56] References Cited

U.S. PATENT DOCUMENTS

| | | | |
|---|---|---|---|
| 4,556,938 | 12/1985 | Parker et al. | 395/375 |
| 4,785,204 | 11/1988 | Terada et al. | 307/451 |
| 4,833,605 | 5/1989 | Terada et al. | 364/404 |
| 4,860,191 | 8/1989 | Nomura et al. | 395/200 |
| 4,972,315 | 11/1990 | Yamasaki et al. | 395/400 |
| 5,003,525 | 3/1991 | Shimamoto et al. | 369/44.41 |
| 5,043,880 | 8/1991 | Yoshida | 395/375 |
| 5,048,009 | 9/1991 | Conrad | 370/17 |
| 5,115,510 | 5/1992 | Okamoto et al. | 395/775 |
| 5,125,097 | 6/1992 | Okamoto et al. | 395/800 |

FOREIGN PATENT DOCUMENTS 62-239237 10/1987 Japan .

OTHER PUBLICATIONS

Shinji Komori and Kenji Shima, "A Data-Driven Microprocessor", Jun. 1990, pp. 26–28, Mitsubishi Electric ADVANCE.
Hiroaki Nishikawa et al., "Architecture of a VLSI-Oriented Data-Driven Processor: the Q-v1", 1991, pp. 247-164, Advanced Topics in Data-Flow Computing.
Data Driven System For High Speed Parallel Computing-Part 2, Hardware Design. by John Gurd and Ian Watson 1981.

*Primary Examiner*—Robert B. Harrell
*Assistant Examiner*—Meng-Ai T. An
*Attorney, Agent, or Firm*—Wolf, Greenfield & Sacks

[57] ABSTRACT

Disclosed is a data processor incorporating a timer function for measuring the time on the basis of a circulation time of a timer packet circulated through a circular pipe line for circulating said packet, a timer function for measuring the time by comparing the time information read from a time information reading means controlled by a process code having a packet with a preset time value and a timer function for measuring the time by comparing a timer packet given from outside at a predetermined timing with the preset time value.

24 Claims, 20 Drawing Sheets

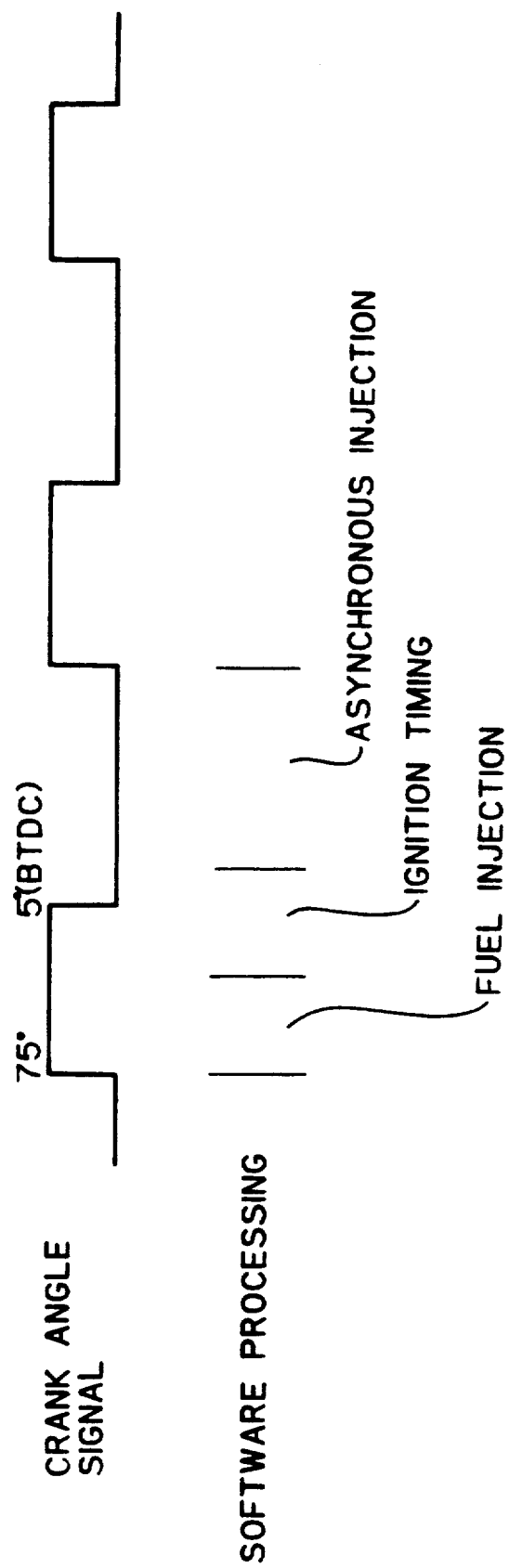

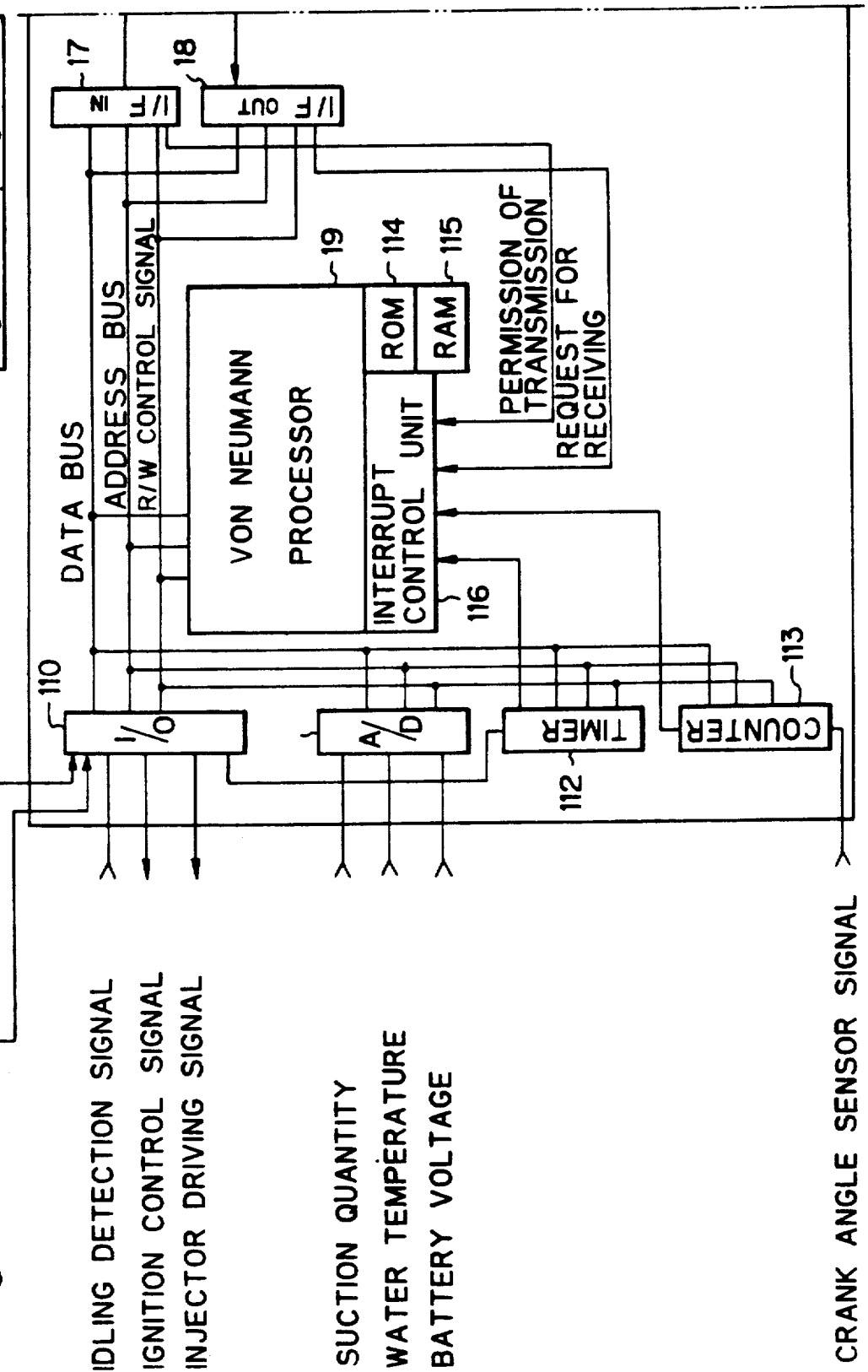

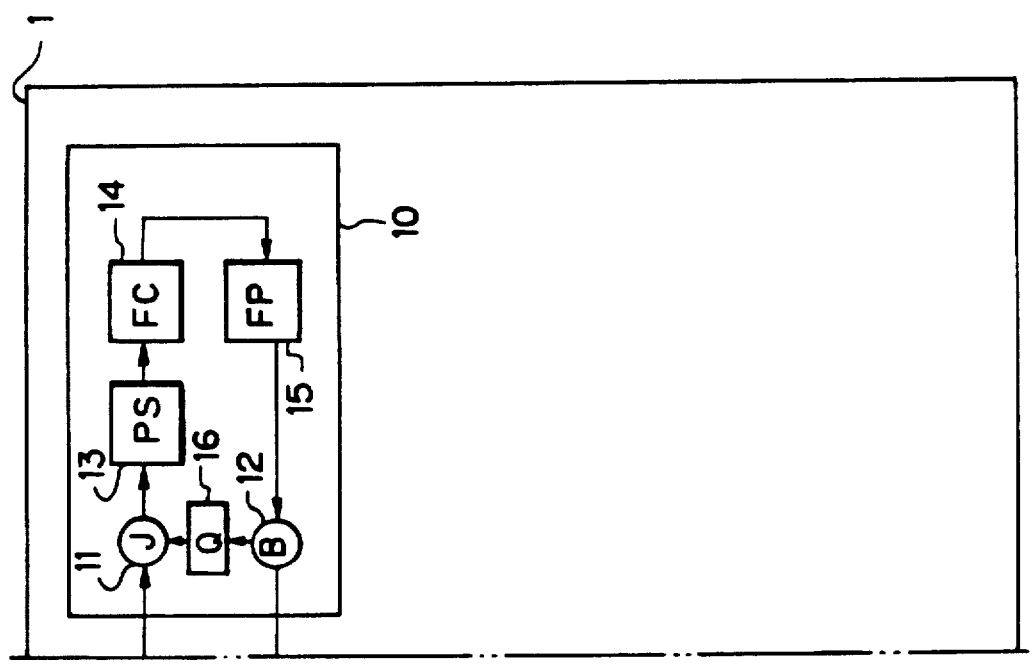

DATA-FLOW PROCESSOR HAVING TIMER CONTROL MECHANISM FOR EFFECTING TIME CONTROL PROCESSING BY CREATING OR INTRODUCING TIMER PACKET INTO DATA PATH

BACKGROUND OF THE INVENTION

The present invention is directed generally to a data-flow type control processor, and more particularly, to a control processor applied to a variety of control processes including time elements such as engine control, motor control and robot control.

FIG. 10 illustrates an example of the construction of an automobile engine control unit which is now being utilized as a product. FIG. 11 is a diagram depicting one example of the interior of a von Neumann control processor employed in an engine control unit.

In these Figures, the reference numeral 100 designates a von Neumann control processor; 101 a power transistor; 102 an ignition coil; 103 a distributor; 104 a spark plug; 105 an I/O unit of the processor 100; 111 an analog-to-digital converter (A/D converter); 112 a timer; 113 a counter; 114 a ROM; 115 a RAM; 116 an interrupt control unit; and 117 a CPU.

The von Neumann processor is classified as a processor for sequentially executing previously accumulated programs with the aid of the program counter.

The following is a description of the operation of the conventional von Neumann control processor.

Main input signals inputted to the engine control unit 100 include a crank angle sensor signal for providing pieces of information on the number of revolutions of the engine and an ignition timer, a suction quantity signal corresponding to an engine load, a water temperature signal corresponding to an engine temperature and a battery voltage signal associated with a battery electromotive force. Output signals include an ignition control signal and an injector driving signal.

The engine control unit 100 detects values, indicating an engine condition, such as the number of revolutions of the engine, the suction quantity, the water temperature by using signals from the sensors. Based on the detected values, an optimum ignition timing is calculated from a preset ignition timing formula and table. A primary current of the power transistor 101 is cut off in accordance with the calculated ignition timing. The ignition timing is controlled by driving the ignition coil 102. An idling detection signal among the input signals is expressed in a digital value to simply show a binary state thereof. The idling detection signal is read via the I/O 100. The suction quantity signal, the water temperature signal and the battery signal are inputted as analog values. The analog values are converted into digital values by the A/D converter 111.

The crank angle sensor signal is inputted directly to the interrupt control unit 116 to cause an interruption; or alternatively the sensor signal is frequency-divided by the counter 113 for counting a predetermined number of crank angle pulses and thereafter inputted to the interrupt control unit 116 to cause the interruption.

A method of calculating the ignition timing by employing the signals given above will be described. FIG. 12 is a conceptual diagram showing the calculation of ignition timing and correcting processes as well. The calculation starts with obtaining a basic ignition timing (phase) $\theta_B$ from values of the suction quantity signal and the crank angle signal. Added to this ignition timing value is a water temperature correction (phase) $\theta_{WT}$ in response to the water temperature signal defined as an engine warm-up condition signal. A correction value going back to a time of an top dead point $-5°$ is determined from those signals. Namely, an ignition timing (phase) $\theta_{ADV}$ is given by:

$$\theta_{ADV} = \theta_B + \theta_{WT}$$

Besides, an actual ignition timing is determined by effecting an electrifying correction by a battery voltage a saction quantity correction by a suction quantity signal and a water temperature correction by a water temperature signal on the basis of the crank angle sensor signal.

The CPU 117 depicted in FIG. 11 executes these arithmetic processes. A program thereof is stored in the ROM 114. The RAM 115 serves to hold intermediate results. The CPU 117 is classified as a von Neumann computer including an address counter for indicating an address of the ROM 114 incorporating an execution program.

An injector pulse for suction/fuel control is calculated as follows. A pulse width Ti is expressed such as:

$$Ti = Fuel \times Kaf \times Kwt \times KvB$$

where Fuel is the value representing a saction quantity, Kaf is the suction quantity correction coefficient, Kwt is the water temperature correction coefficient and KvB is the battery voltage correction coefficient. This arithmetic operation is started by both the crank angle sensor signal and the idle signal.

FIG. 13 is a flowchart showing a software architecture associated with the calculations described above. In the drawing, "W.D.T." represents a "Watch Dog Timer". As in the way with an interrupt routine of FIG. 13(b), an idle detection sensor discerns whether the fuel is cut or not. In the drawing, "BTDC" and "EST" represent "Before Top Dead Center" and "Electric Spark Timing", respectively.

The software is, as illustrated in FIG. 17, executed throughout entire crank angle sensor signal cycles. Three cycles—fuel injection, ignition timing and asynchronous injection—are repeated at every crank angle of 180°.

FIG. 15 is a block diagram depicting a construction of the control processor disclosed in Japanese Patent Application No. 133316/1989, published Dec. 26, 1990 as Japanese Patent Laid-Open Publication No. 310788/1990. Referring to FIG. 15, the numeral 1 represents a control processor; and 10 a data driven processor (DFP). The DFP 10 comprises a packet junction unit (J) 11, a packet branch unit (B) 12, a program storage unit (PS) 13, a firing process unit (FC) 14, an arithmetic operation unit (FP) 15, a queue buffer unit (Q) 16, an input interface (I/F$_{IN}$) 17 of the DFP 10, an output interface (I/F$_{OUT}$) 18 and a von Neumann processor 19 for controlling the control processor as a whole. The components marked with the numerals 110 to 116 are much the same as those shown by like numerals.

FIG. 16(a) depicts the input interface (I/F$_{IN}$) of the DFP 10. The numeral 171 denotes a data unit latch; 172 a tag unit latch; 173 an address decoder; 174 a write selector; 20 and AND gate; 21 an inverter; and 22 a flip-flop fitted with reset/set terminals. FIG. 16(b) illustrates the output interface (I/F$_{OUT}$) of the DFP 10. The numeral 175 represents a read selector; and 23 a NAND gate. FIG. 16(c) shows the A/D converter 111. The numeral 181 stands for an address latch; 182 an analog multiplexer; and 183 an A/D converting circuit. FIG. 16(d) depicts the I/O unit 110. The numeral 184 represents an input buffer; 185 an output buffer; and 186 a data latch. FIG. 16(e) depicts the counter 113. A counter 187 has a preset input.

Next, the operation of the control processor depicted in FIG. 15 will be explained.

Inputted to the control unit 1, as in the conventional example of FIG. 11, are a crank angle sensor signal, a suction quantity signal corresponding to an engine load, a water temperature signal corresponding to an engine temperature and a battery voltage signal. Output signals include an ignition control signal and an injector driving signal. FIGS. 13(a) and 13(b) show examples of a main routine job and an interrupt job. Necessary data in the input signals are taken in when generating the interrupt signal of the crank angle while perpetually computing the job of FIG. 13(b). The processes of FIG. 13(b) are thus executed. At this time the von Neumann processor 19 receives the information from the peripheral units, i.e., the I/O unit 110, the A/D converter 111, the timer 112 and the counter 113. The processor 19 generates arithmetic packets for the DFP 10 and supplies these packets via the interface I/F$_{IN}$ 17 to the DFP 10. The DFP 10 in turn transfers the arithmetic result to I/F$_{OUT}$ 18. The von Neumann processor 19 receives the arithmetic result by an interruption generated therefrom. The processor 19 outputs the arithmetic result as an ignition control signal or an injector driving signal.

Data processing within the DFP 10 is carried out by tags possessed by the packets. The von Neumann processor 19 transfers the data with a destination tag to the DFP 10. The data received by the von Neumann processor 19 from the DFP 10 have the tags. With this arrangement, the von Neumann processor 19 is capable of discerning the data received from the DFP 10, viz., distinguishing an ignition control signal or an injector driving signal.

The prior art data-flow type control processor is constructed in the manner described above. The timer is externally attached to obtain the time information. A variety of real time processes are executed by the following steps. Reading is performed by polling a value of the time. Alternatively, an interruption is generated when the external timer reaches a predetermined value, and reading is carried out by the interrupting process according to necessity. In any case, the information is transferred via the von Neumann processor by the counter or the timer connected to a bus. The von Neumann processor is required in addition to the timer and the counter. Consequently, there arises a problem of increasing a scale of the system.

It is an object of the present invention, which has been devised to obviate the foregoing problems, to provide a control processor capable of giving the time information to the arithmetic operation in a data-flow processor without using the von Neumann processor.

SUMMARY OF THE INVENTION

In a control processor of the present invention, a timer function is attained by making a description with a data-flow graph defined as a data-flow program or by accessing an externally provided timer with a predetermined instruction or by a data-flow graph described with a timer packet inputted from outside at a predetermined timing.

In accordance with this invention, the timer function attainable by the methods described above is added to a data driven processor, whereby the time control is executed. It is therefore possible to miniaturize a system scale of the control processor applicable to the real time processes such as automobile engine control, electric motor control, robot control and acoustic characteristic control which require a variety of time processes.

BRIEF DESCRIPTION OF THE DRAWINGS

Other objects and advantages of the invention will become apparent during the following discussion taken in conjunction with the accompanying drawings, in which:

FIGS. 10, 11, 12, 13(a), 13(b), 14, 15, 16(a), 16(b), 16(c), 16(d) and 16(e) are diagrams of assistance in explaining a conventional control processor;

Note that the same symbols in the Figures indicate the like or corresponding components.

DETAILED DESCRIPTION OF THE PREFERRED EMBODIMENTS

The present invention will hereinafter be described by way of illustrative embodiments with reference to the accompanying drawings.

Figure 1:
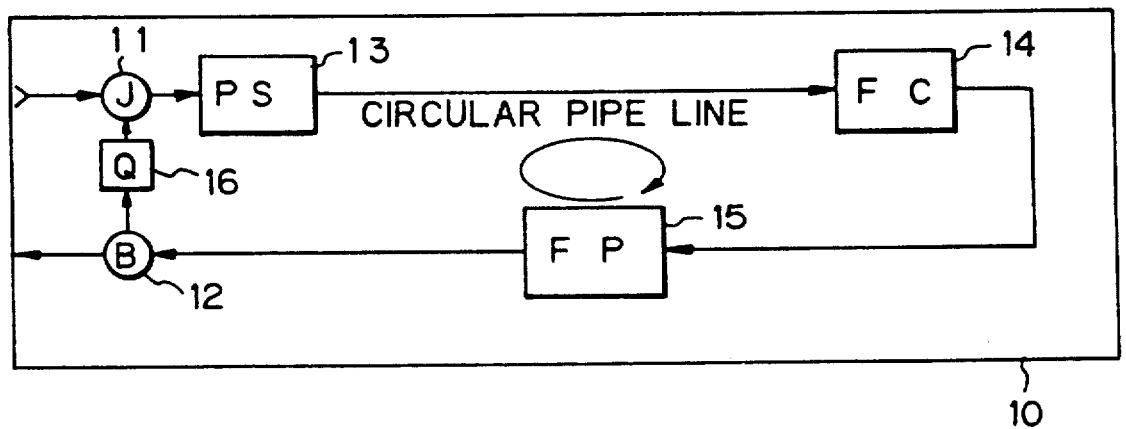
FIG. 1 is a block diagram depicting a data-flow processor conceived as a control processor in a first embodiment of this invention.

FIG. 1 is a block diagram depicting a data-flow processor defined as a control processor in accordance with a first embodiment of this invention. Referring to FIG. 1, the numeral 10 represents a data-flow processor; 11 a junction module (J); 12 a branch module (B); 13 a program storing module (PS); 14 a firing process module (FC); 15 an arithmetic operation module (FP); and 16 a queue buffer.

A data driven processor depicted in FIG. 1 has already been explained in the prior art example. The following is a description of the basic operation thereof. To be specific, the packet reads a program from the program storing module PS 13 on the basis of the next destination node number information possessed when being inputted. A packet inputted to the processor 10 uses it as its own new tag and is transferred to the firing process module FC 14. The firing process module FC 14, when the arithmetic operation to be executed is a binary operation, finds out a partner packet paired with the one undergoing the arithmetic operation from a packet's next destination node number and further from identification numbers of environment and generation as the case may be. The paired packets are sent to the arithmetic operation module FP 15. If the partner packet can not be found, there is a delay within the FC till the partner packet comes. In the case of the operation which does not require the firing process, the packets merely pass through the firing process module FC 14 and go to the arithmetic operation module FP 15. The arithmetic operation module FP 15 performs the arithmetic operation by using operation codes held within the tags of the packets themselves. There is made a judgment as to whether the packets are, after finishing the process, transferred outside from the branch module B 12 or further continuously processed inside. If continuously processed inside, the packets pass through the queue buffer Q 16 and the junction module J 11 as well. The packets again come to the program storing module PS 13. Subsequently, the same processes are repeated.

Even the data processor 10 which effects the operations discussed above needs the execution of timer-included time correspondence processes in a control application. In accordance with the first embodiment of this invention, the timer packets (tagged data) are circulated through a circular pipe line consisting of the program storing module PS 13, the firing process module FC 14 and the arithmetic operation module FP 15. The time is measured based on a circulation time unit of the packets.

Next, the operation of the first embodiment will be described.

Figure 2:
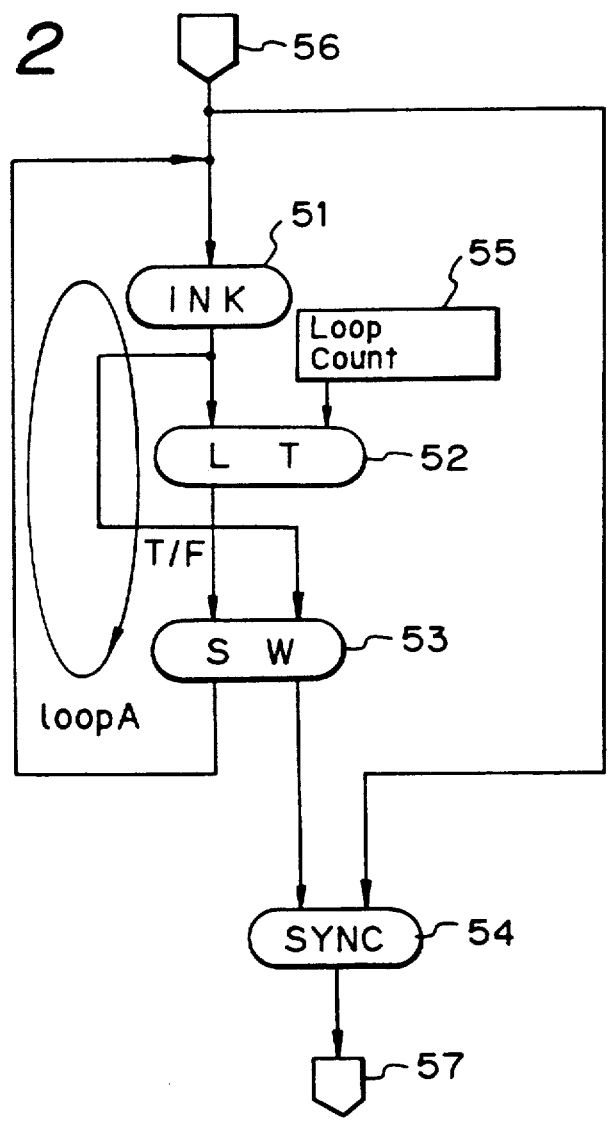
FIG. 2 is a diagram showing a data-flow graph describing a program executed by the data-flow processor of FIG. 1, the program serving to actualize a timer.

FIG. 2 is a diagram showing a descriptive example of a data-flow graph describing a program for actualizing the timer operation of the control processor in the first embodiment of the invention. Referring to FIG. 2, the numeral 51 denotes an increment instruction node; 52 a Less Than comparing instruction node; 53 a switch instruction node; 54 a synchronous node; 55 a loop count constant storage; 56 an input port; and 57 an output port.

Referring again to FIG. 2, the packets inputted from the input port 56 are circulated through a loop A several times corresponding to a loop count stored in the constant storage 55. Thereafter, the packets are sent from the output port 57 as an output of the synchronous node SYNC 54. One circulation of the loop A corresponds to three circulations of the circular pipe line because of executing the increment instruction 51, the Less Than comparing instruction 52 and the switch instruction 53. A high time accuracy is not necessarily obtained in the first embodiment. A process to give a time delay may, however, be attained.

A second embodiment of this invention will next be explained with reference to FIGS. 3 to 5.

Figure 3:
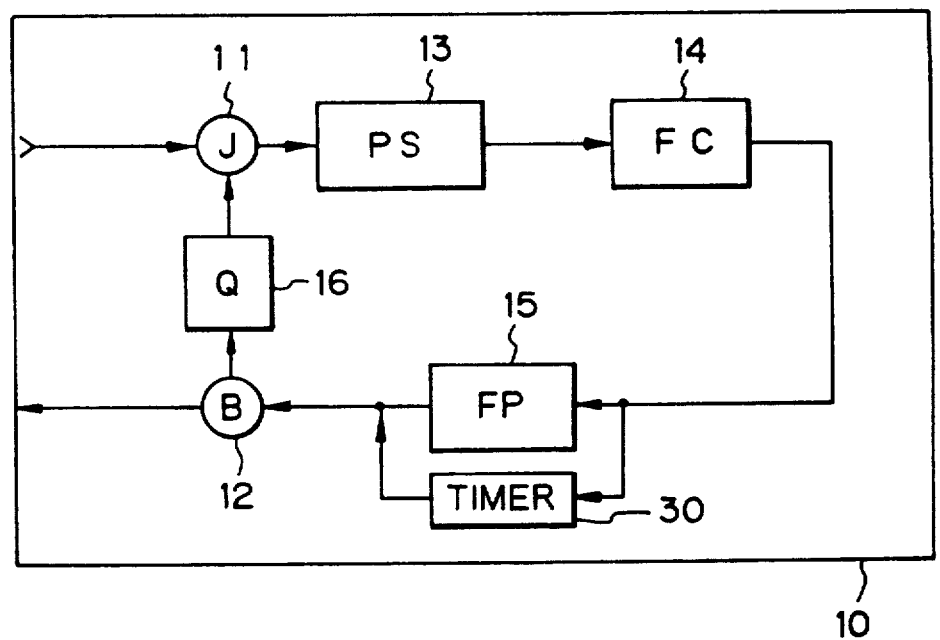
FIG. 3 is a block diagram illustrating a data-flow processor defined as a control processor in a second embodiment of the invention.

FIG. 3 is a diagram depicting a data-flow processor as a means for attaining a timer function. The data-flow processor is constructed to execute the timer function in the same way with the execution of arithmetic operation by connecting a timer module in parallel to the arithmetic operation module FP 15. In FIG. 3, the numeral 30 represents a timer module.

Figure 4:
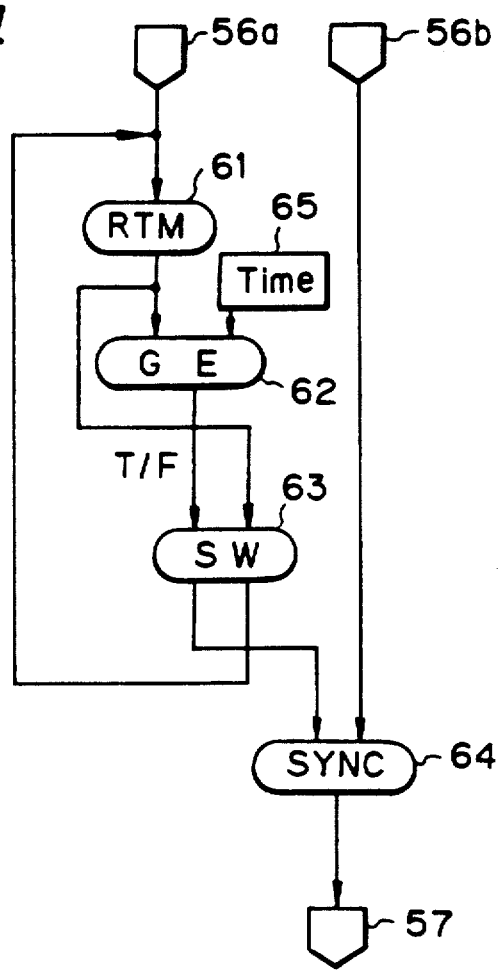
FIG. 4 is a diagram showing a data-flow graph which describes a program of an timer arithmetic instruction execution which is executed in the processor of FIG. 3.

FIG. 4 is a data-flow graph diagram showing an example of a timer operation instructing execution program executed in the processor 10 of FIG. 3. In FIG. 4, the numeral 61 designates a read timer (RTM) instruction node; 62 a comparing instruction node; 63 a switch (SW) instruction node; 64 a synchronous (SYNC) instruction node; and 65 a set time constant storage.

Figure 5:
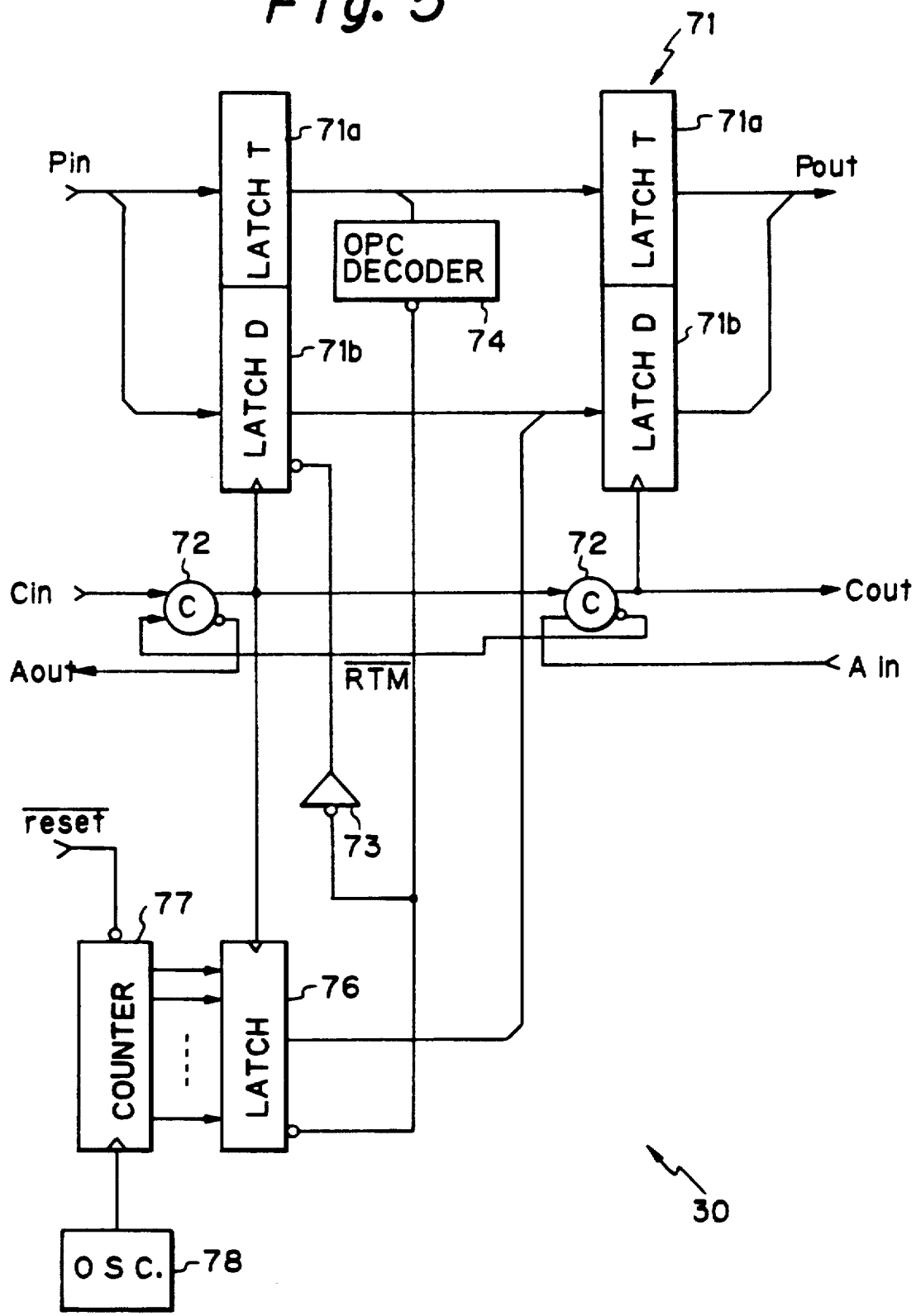
FIG. 5 is a diagram illustrating an example of construction of the timer.

FIG. 5 is a diagram showing an example of construction of the timer module 30. Referring to FIG. 5, the numeral 71 a packet latch composed of a tag latch 71a and a data latch 71b; 72 a transfer control element using a C element (coincident element); 73 an inverter; 74 an operation code decoder; 76 an output controlled latch; 77 a reset counter; and 78 an oscillator.

Next, the operation of the second embodiment will be explained. As illustrated in FIG. 3, the timer module 30 is connected in parallel to the arithmetic operation module FP 15. When the RTM instruction enters the timer module 30, a value of the timer module 30 is read. At this time, the arithmetic operation module FP 15 performs no processing. Other configurations are the same as those shown in FIG. 1.

The execution of program will be described on the assumption that the timer module 30 functions before the packets enter inputs 56a and 56b in FIG. 4. More specifically, the counter 77 of FIG. 5 is reset once and effects counting by a clock input of the oscillator 78. Referring back to FIG. 4, the RTM instruction 61 is executed when entering the input 56a. The value of the timer module 30 is compared with a value previously stored in the set time constant storage 65. If the comparative result is "false" (in this case, the value read from the timer module is less than the set time constant storage value), the RTM instruction 61 is again executed in response to the SW instruction 63. Whereas if "true" (the former is larger than the latter), the SYNC instruction 64 is executed in response to the SW instruction 63. The packets are transferred to the output 57 after synchronizing with the other input 56b which has received an input thereof till the set time value (Time) is reached.

Other processes are allowed to be started after a time corresponding to the thus set time value has elapsed.

The following is a description of the construction of the timer module 30. The symbol Pin represents an input data packet of the timer module 30, and Pout is an output data packet. Signals Cin and Aout indicate an input of the packet Pin and signal receiving. Signals Cout and Ain indicate an output of the packet Pout and signal receiving on the output side. The signals Cin and Cout are present there when both of them are "1". The signals Ain and Aout are present when they are "0" (busy). More specifically, when Aout is "1", no data packet exists in the first stage latch. This implies that Cin is allowed to enter. When Cin="1", then Aout="0" by effecting the write to the first stage latch. Next, the data packet is transferred to the second stage latch similarly by handshake, and then Aout="1". As a result, the data packet from Cin can be again inputted. The action on the Pout side is the same. When Ain="1", the output side is unoccupied, so that Cout="1". An output of Pout is given forth, and Ain="0". Subsequently, the output thereof is transferred in advance of it, and then Ain="1". The action is performed to permit the next output.

As discussed above, the data packets are transferred from Pin to Pout under the control of C and A. The transferred data packet reads an operation code from the tag latch 71a. The packet inputs the code to the opc decoder 74. If the operation code is identical with the RTM instruction 61, the action is not that the data is read from the data latch 71b but that an output of the latch 76 of the counter 77 is given to the next stage (second stage) data latch 71b. The latch 76 has time information of the timer module. A reset input of the counter 77 is reset on receiving an output of the opc decoder 74 which is specified by the operation code. As explained earlier, the counter 77 receives both the reset input reset and the input from the oscillator 78.

Figure 6:
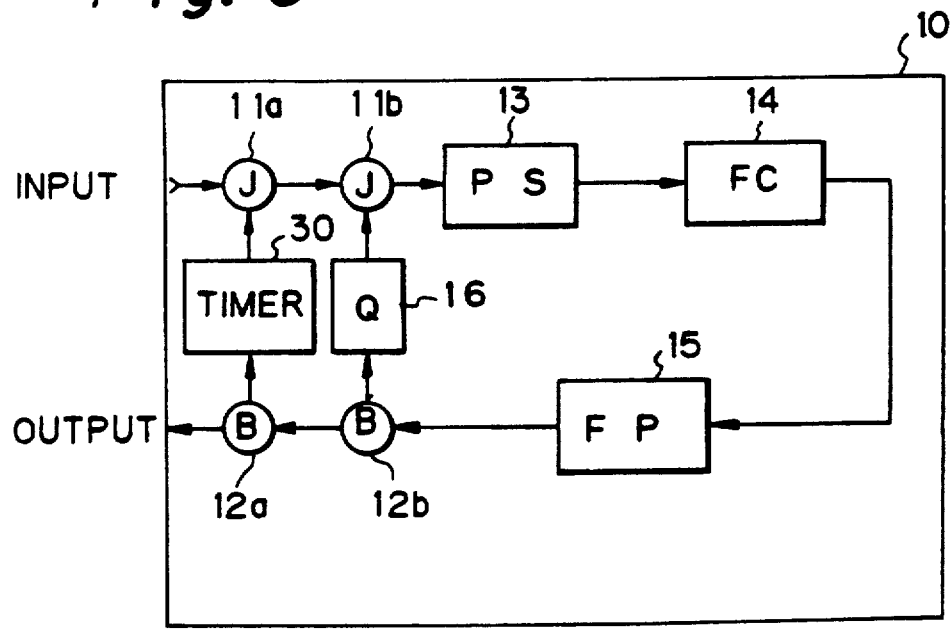
FIGS. 6, 7, 8 and 9 are diagrams each showing a variant form of the second embodiment of the invention.

The timer module 30 is connected in parallel to the arithmetic operation module FP 15 in the second embodiment. However, a practicable arrangement is that as in a variant form of FIG. 6, the timer module 30 is connected in parallel to the queue buffer Q 16 to execute its process in series to the process of the arithmetic operation module FP 15. In this case, the RTM instruction 61 is not processed in the arithmetic operation module FP. The packet having the RTM instruction 61 at a branch 12b is transferred not to Q 16 but to the timer module 30 via a branch 12a.

Figure 7:
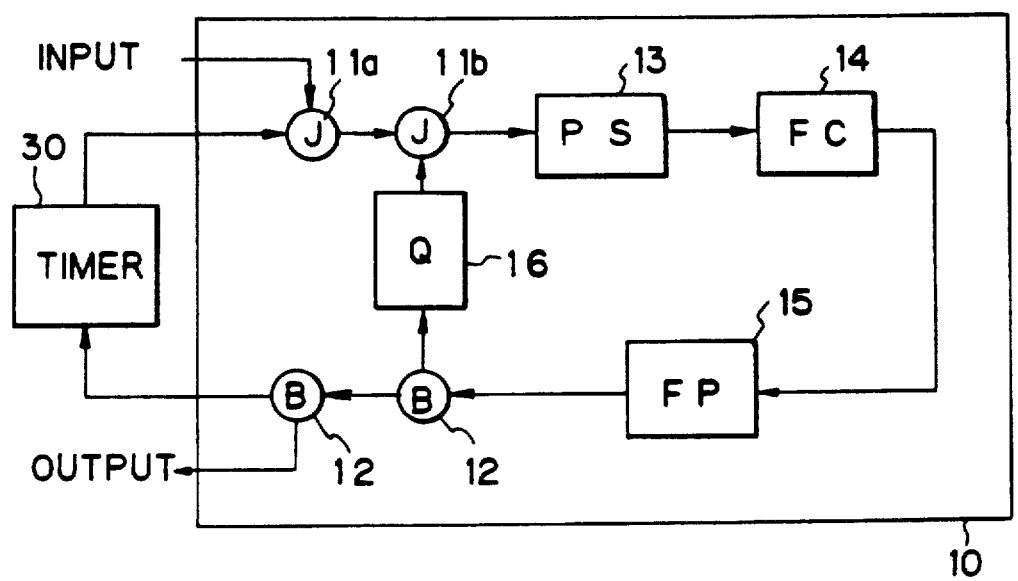

FIG. 7 is a diagram showing a variant form in which the timer module 30 is disposed outwardly of the processor 10. The operation is the same as that shown in FIG. 6.

Figure 8:
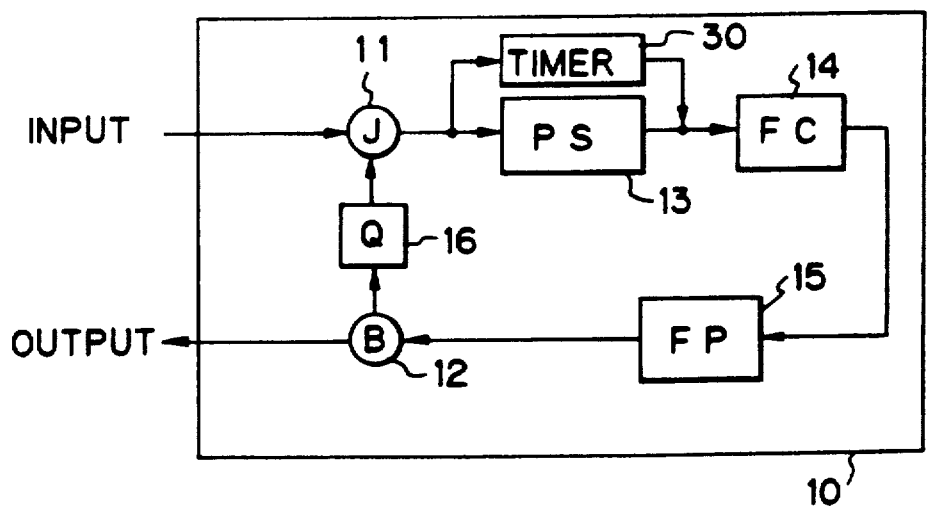
Figure 9:
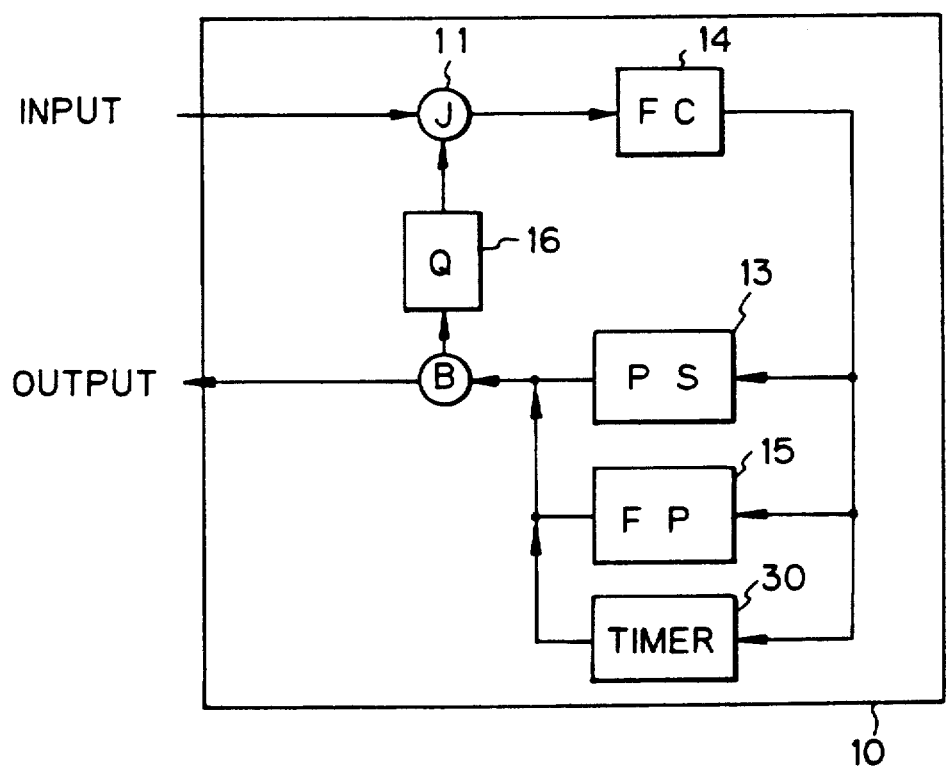
Figure 10:
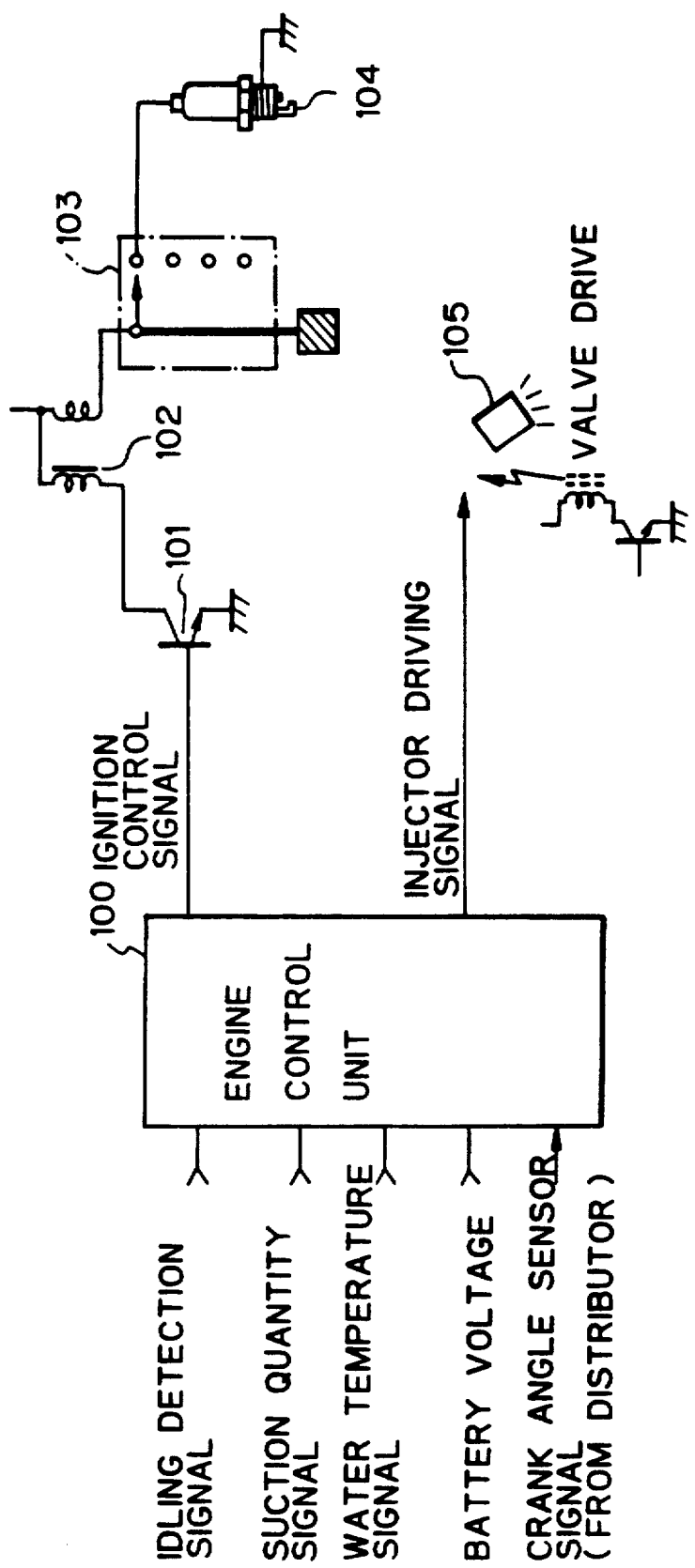
Figure 11:
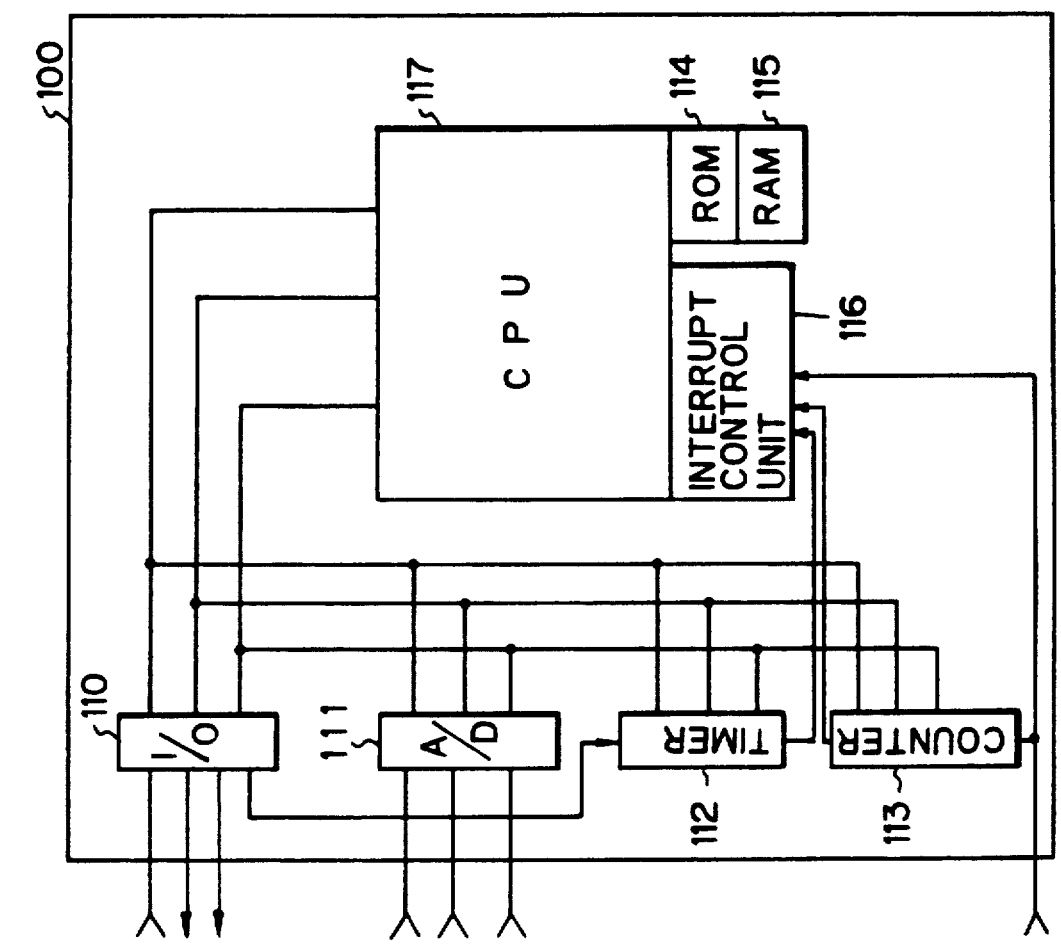
Figure 12:
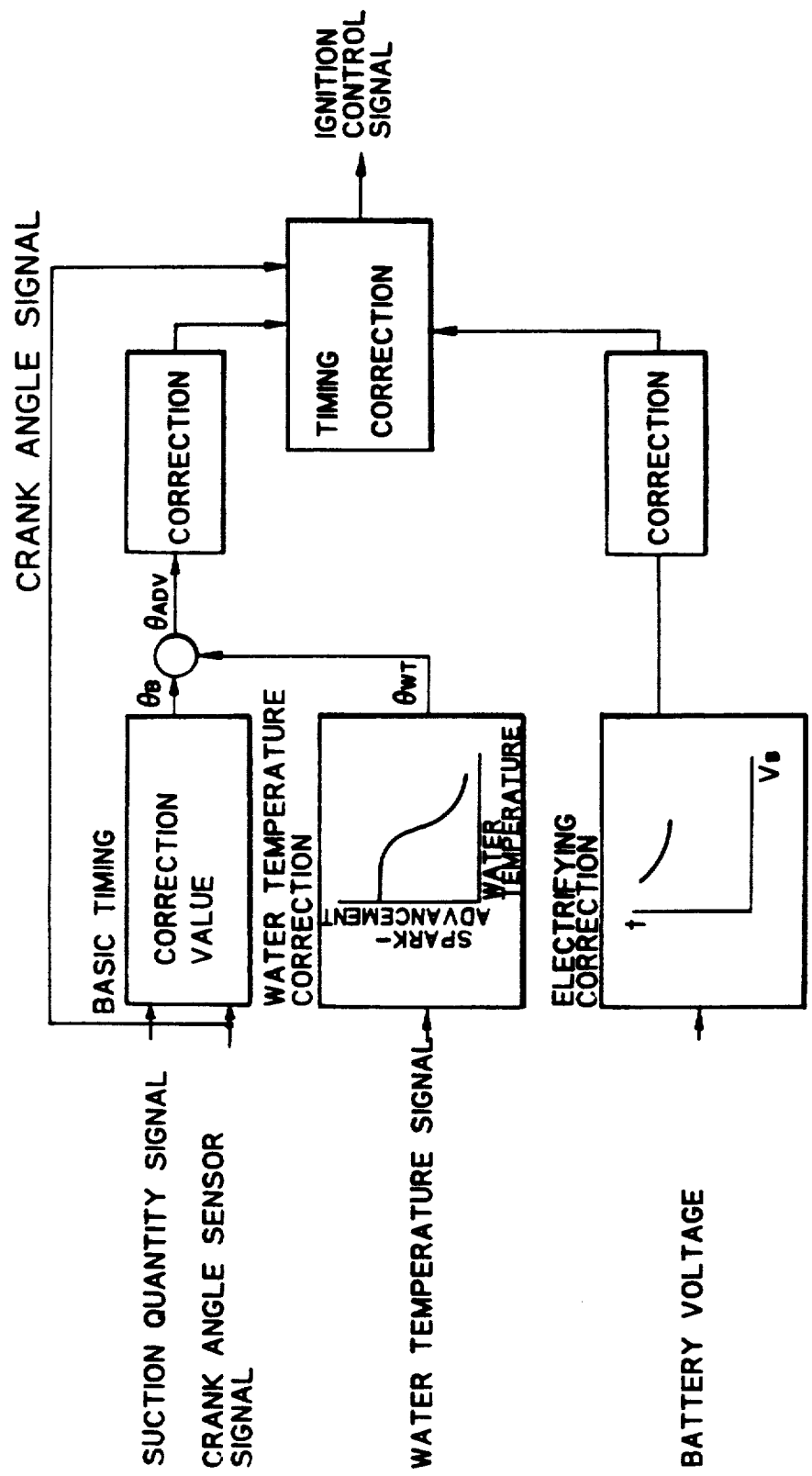
Figure 13A:
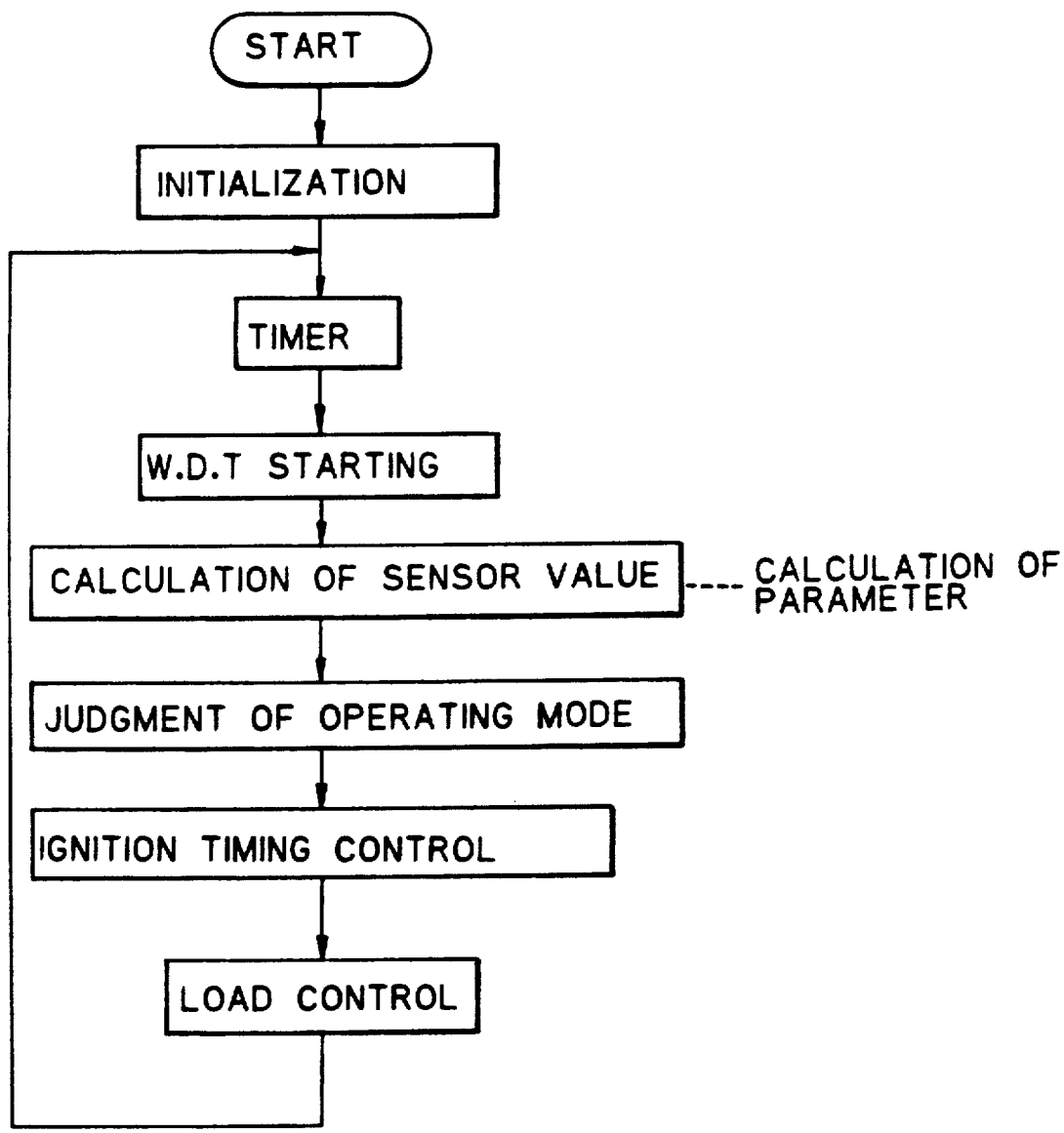
Figure 13B:
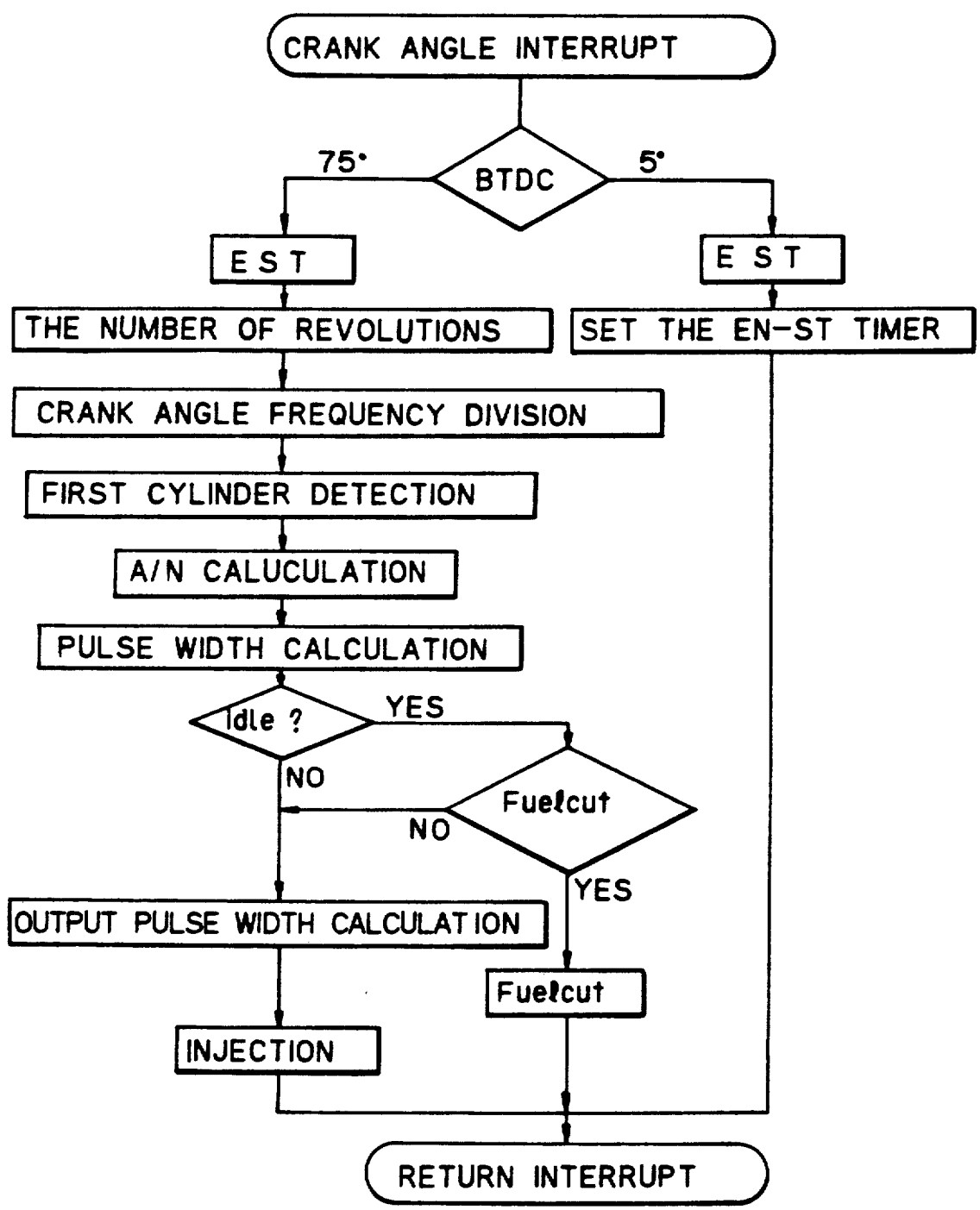
Figure 16A:
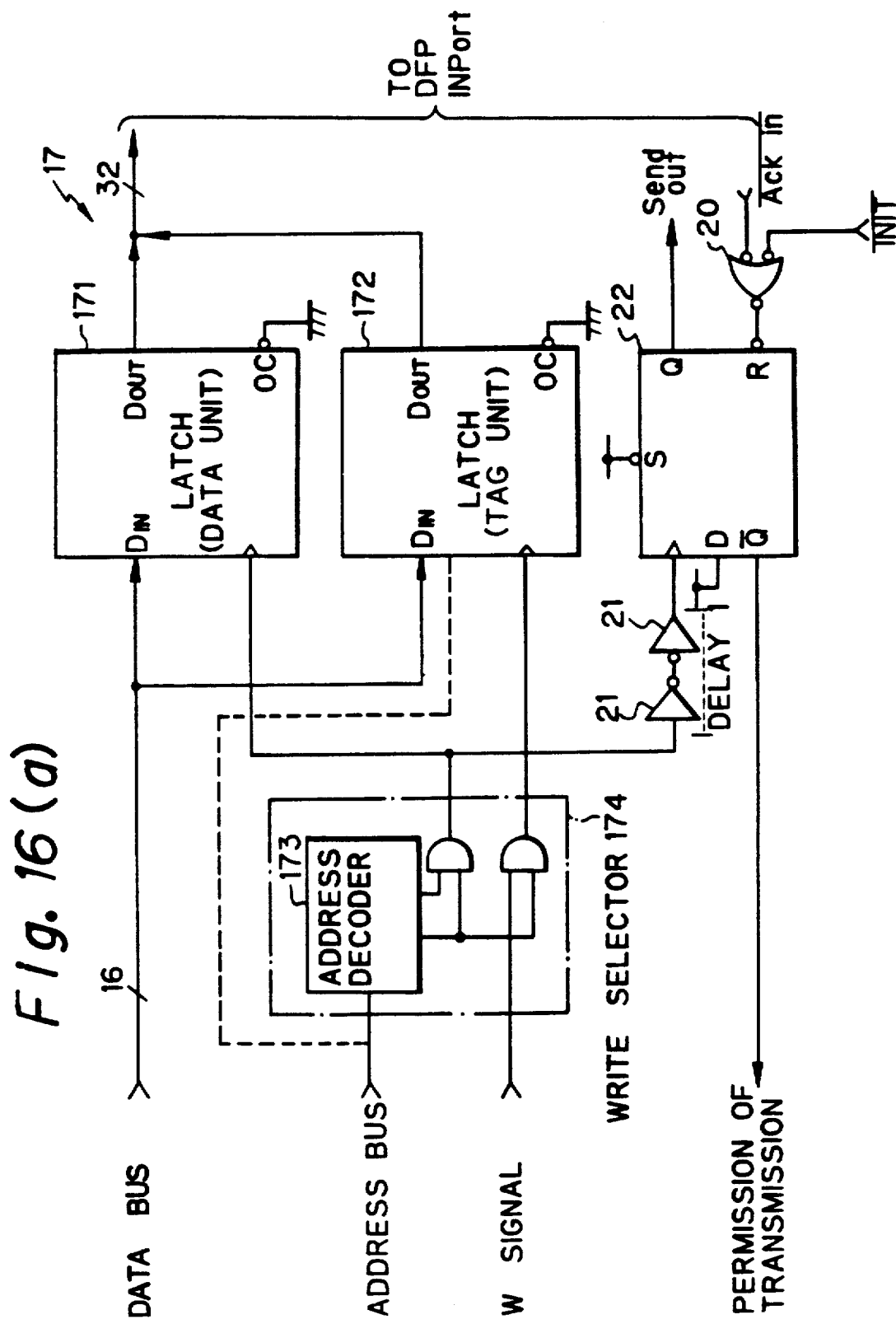
Figure 16B:
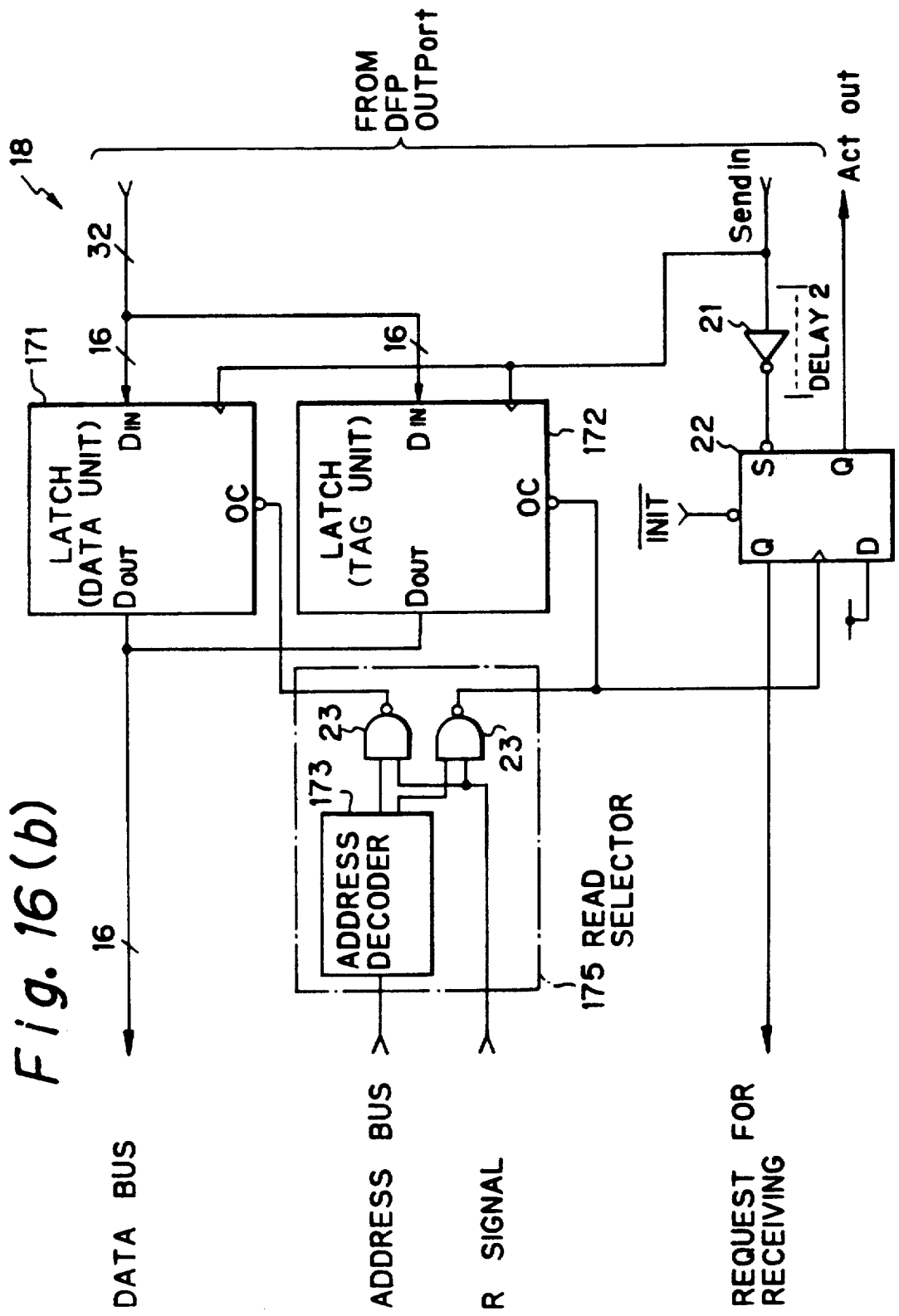
Figure 16C:
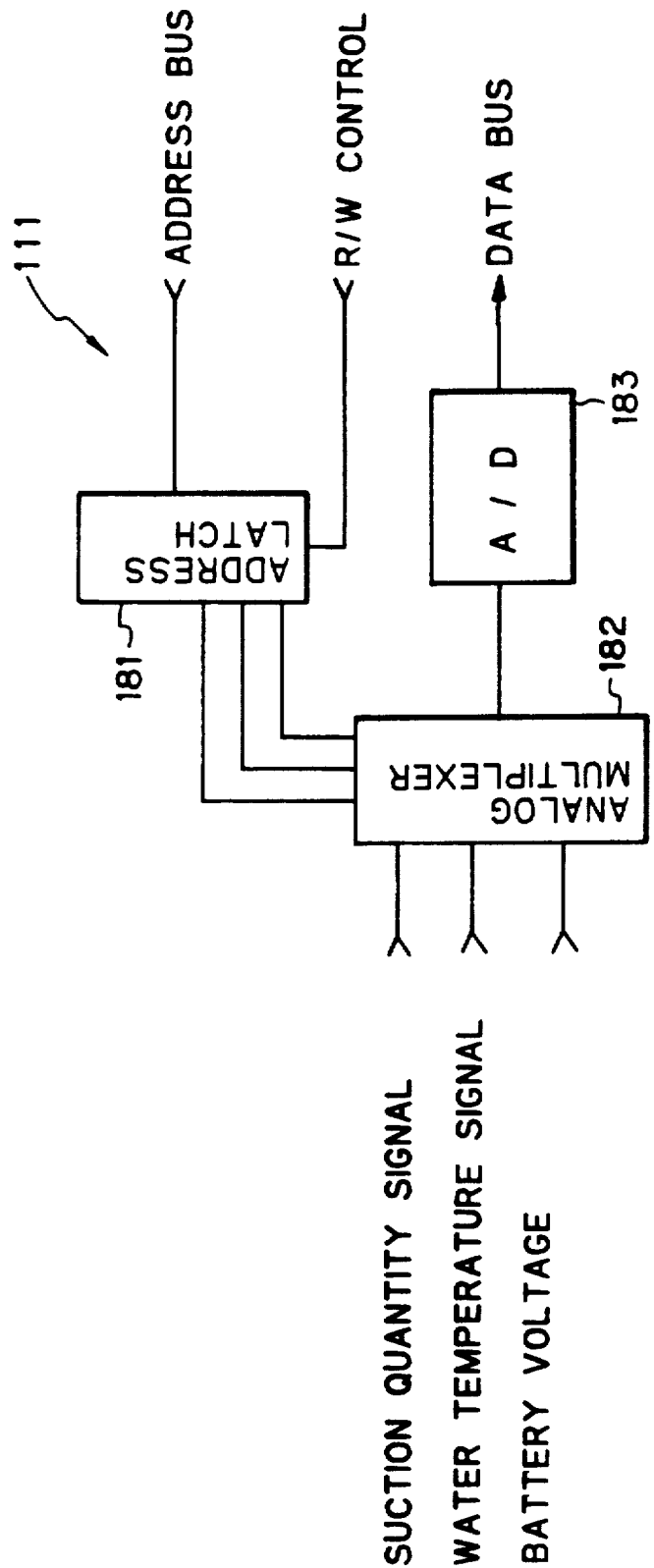
Figure 16D:
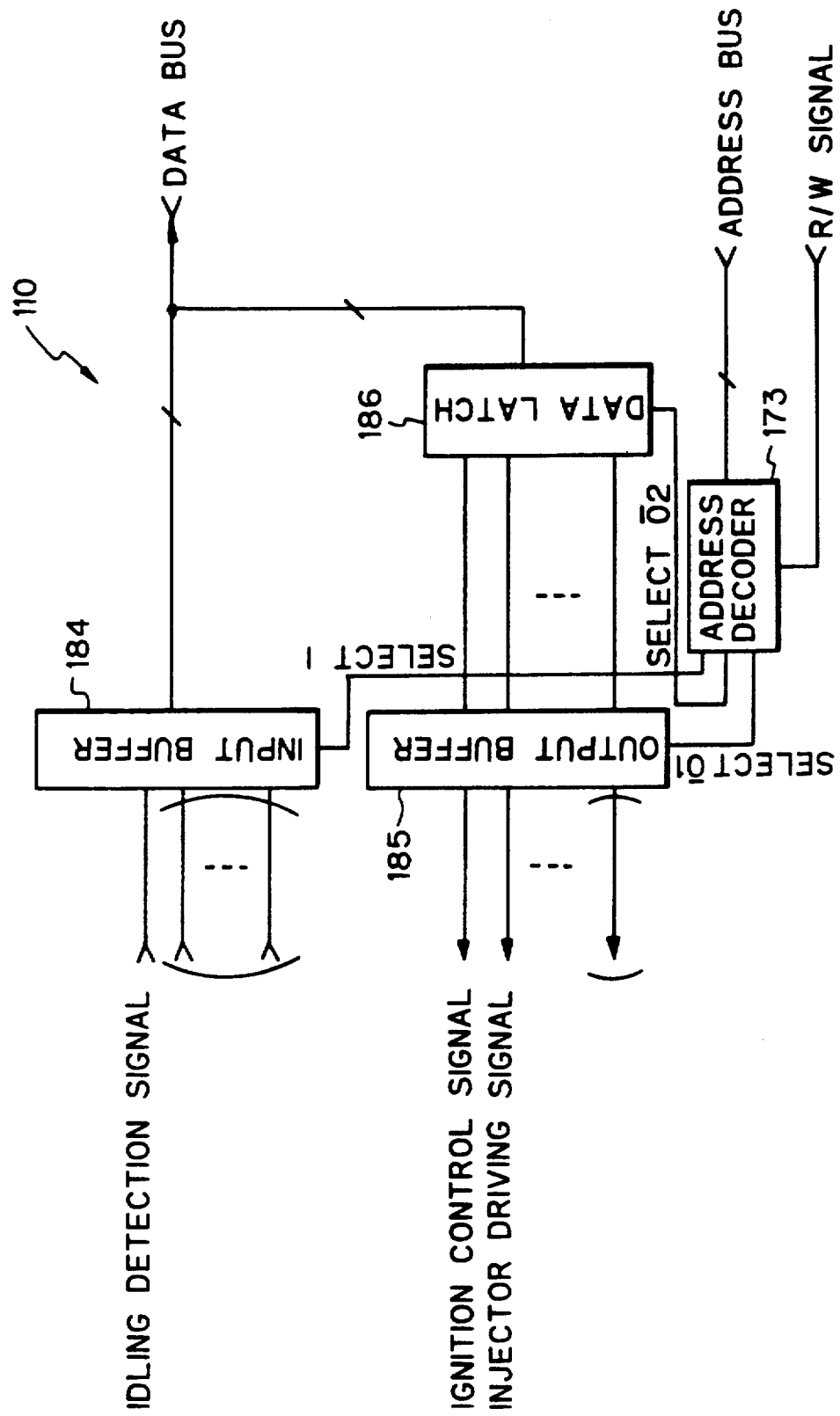
Figure 16E:
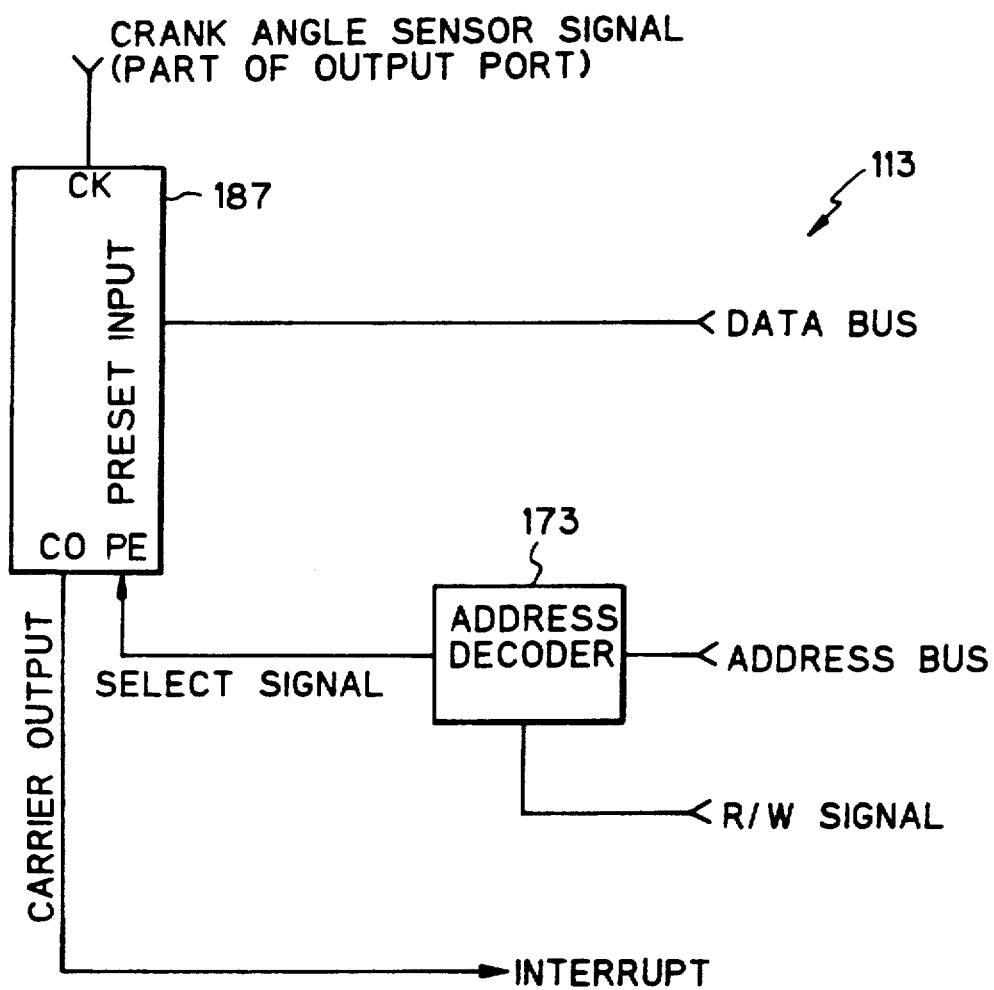

Turning to FIG. 8, the timer module 30 is connected in parallel to the programs storing module PS 13. A process arrangement is that the timer information is read from the program storing module PS 13 as in the constant access when executing the RTM instruction 61. The process can be executed substantially in the same manner as with FIG. 4. Besides, the same function is performed also in the arrangement that the program storing module PS 13, the arithmetic operation module FP 15 and the timer module 30 are, as illustrated in FIG. 9, disposed in parallel. The program access and the arithmetic operation are essentially parallel. The reason why the process of the timer module 30 may simultaneously be executed is the same with the action in the variant form of FIG. 8.

Now, a timer packet employed in the data-flow processor will be described.

Figure 18:
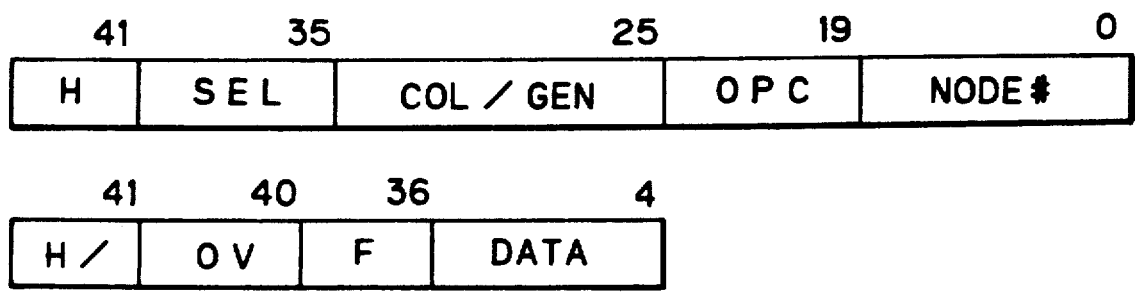
FIG. 18 is a chart showing a 2-word packet format employed for the data-flow processor.

FIG. 18 is a diagram illustrating a 2-word packet format. A first word (tag part) is shown in an upper stage, while a second word (data part) is shown in a lower stage. The timer packet is configured by giving operation codes such as "TIMER READ", "GET TIME" and the like to an instruction code (opc) of the packet shown in FIG. 18. Time/timer information is given as DATA by the operation codes in the timer module.

A third embodiment of the invention will next be explained.

In the second embodiment discussed above, the readout of the timer module is carried out to attain the timer function. The value of the timer module is compared with the constant storage value. In the third embodiment, however, a packet having the time information or corresponding to the time information is given from outside to the processor via the input port. A process of synchronization by using the program based on the internal data-flow graph is additionally actualized.

Figure 17:
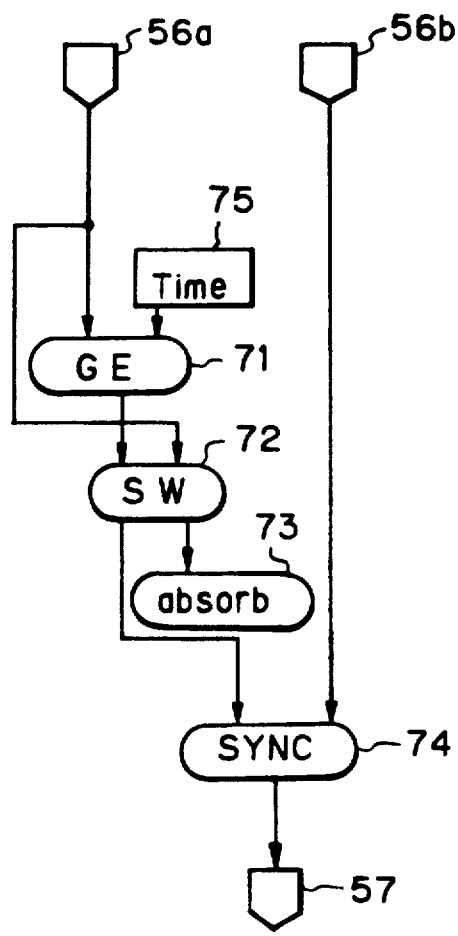
FIG. 17 is a diagram showing a data-flow graph describing a program of a timer function which is executed in a processor in a third embodiment of the invention.

FIG. 17 is a diagram of a data-flow graph, showing one example of an operation program described above. In FIG. 17, the same symbols as those shown in FIG. 4 indicate the like or corresponding components. The numeral 71 represents a comparing instruction node; 72 a switch instruction node; 73 an absorb instruction node; 74 a synchronous node; and 75 a set time constant storage.

In accordance with the third embodiment, the packet having the time information is inputted to the input of the data-flow processor at a predetermined timing from outside without performing the timer read-out. The packet having the time information is compared with the set value of the set time constant storage, thereby attaining the timer function. Turning to FIG. 17, if the time information of the packet inputted does not reach the set value, this packet is absorbed by an absorb packet in conformity with the absorb instruction 73 and then disappears. Whereas if the time information reaches the set value, that packet is synchronized with other packets inputted so far, thereby executing the arithmetic operation.

As explained earlier, in the third embodiment also, the time control process is practicable as in the way with other embodiments given above, and the same function is attainable.

As discussed above, according to the present invention, the timer function is actualized by the description with the data-flow graph serving as a data-flow program. The timer function is also actualized by accessing the timer provided inwardly or outwardly of the processor with the predetermined instructions. Besides, the timer function is actualized by use of the data-flow graph described by use of the timer packet inputted from outside at the predetermined timing. It is therefore possible to construct the data-flow processor and its system applicable to so-called real time processing in a variety of control fields including the time elements such as engine control, mode control and robot control. There is exhibited an advantage of accomplishing the high function and high performance by high-speed processing in the various control fields.

Although the illustrative embodiment of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A control processor including a data flow machine adapted to operate on a packet having a tag defining a destination node number, and an operation code, and said packet further having data including data indicative of firable or unfirable, said data flow machine comprising:

program storing means for receiving said packet, and for retrieving in response to said destination node number a next destination node number, an operation code, and a selection code which taken together define a new tag, and for replacing said tag in said packet with said new tag;

firing process means for receiving said packet from said program storing means, for judging whether there is a stored partner packet with which said packet received from said program storing means may form a pair of partner packets, said pair having a first term and a second term of dyadic operands that render said pair of partner packets firable, and for storing said packet if unfirable, and for sending said dyadic operands together with said tags if firable;

arithmetic operation means for receiving said dyadic operands from said firing process means, and for executing an arithmetic operation by operation codes contained in said tags;

branching means, having an input and two outputs, for branching packets;

joining means, having two inputs and one output, for making packets confluent; and queue buffer means for queuing packets;

wherein said joining means, said program storing means, said firing process means, said arithmetic operation means, said branching means and said queue buffer means are connected, one to the next in an order as listed to form a data path; and timer control means, having a loop path, said loop path connected to said data path, for effecting time control processing by receiving a timer packet from said data path, and defining an elapsed time by (i) counting a number of times that said timer packet circulates around said loop path to produce an actual loop count, and (ii) comparing said actual loop count with a stored loop count, said timer control means being actualized by a program and described by a data-flow graph.

2. A control processor including a data flow machine adapted to operate on a packet having a tag defining a destination node number, and an operation code, and said packet further having data including data indicative of firable or unfirable, said data flow machine comprising:

program storing means for receiving said packet, and for retrieving in response to said destination node number a next destination node number, an operation code, and a selection code which taken together define a new tag, and for replacing said tag in said packet with said new tag;

firing process means for receiving said packet from said program storing means, for judging whether there is a stored partner packet with which said packet received from said program storing means may form a pair of partner packets, said pair having a first term and a second term of dyadic operands that render said pair of partner packets firable, and for storing said packet if unfirable, and for sending said dyadic operands together with said tags if firable;

arithmetic operation means for receiving said dyadic operands from said firing process means, and for executing an arithmetic operation by operation codes contained in said tags;

branching means, having an input and two outputs, for branching packets;

joining means, having two inputs and one output, for making packets confluent; and queue buffer means for queuing packets;

wherein said joining means, said program storing means, said firing process means, said arithmetic operation means, said branching means and said queue buffer means may be connected, one to the next in an order as listed to form a data path; and timer control means, having a loop path, said loop path connected to said data path, for effecting time control processing by receiving a packet from said data path, inserting an actual time value into said packet to produce a timer packet, circulating said timer packet around said loop path, and comparing said actual time value with a previously stored time value, said timer control means being actualized by a program and described by a data-flow graph.

3. A control processor as set forth in claim 2, wherein said timer control means is connected in parallel to said arithmetic operation means.

4. A control processor as set forth in claim 2, wherein said timer control means is connected in parallel to said queue buffer means.

5. A control processor as set forth in claim 4, wherein said timer control means is connected outwardly of said data flow machine.

6. A control processor as set forth in claim 2, wherein said timer control means is connected in parallel to said program storing means.

7. A control processor as set forth in claim 2, wherein said program storing means, said arithmetic operation means and said timer control means are connected in parallel.

8. A control processor including a data flow machine adapted to operate on a packet having a tag defining a destination node number, and an operation code, and said packet further having data including data indicative of firable or unfirable, said data flow machine comprising:

program storing means for receiving said packet, and for retrieving in response to said destination node number a next destination node number, an operation code, and a selection code which taken together define a new tag, and for replacing said tag in said packet with said new tag;

firing process means for receiving said packet from said program storing means, for judging whether there is a stored partner packet with which said packet received from said program storing means may form a pair of partner packets, said pair having a first term and a second term of dyadic operands that render said pair of partner packets firable, and for storing said packet if unfirable, and for sending said dyadic operands together with said tags if firable;

arithmetic operation means for receiving said dyadic operands from said firing process means, and for executing an arithmetic operation by operation codes contained in said tags;

branching means, having an input and two outputs, for branching packets;

joining means, having two inputs and one output, for making packets confluent; and queue buffer means for queuing packets;

wherein said joining means, said program storing means, said firing process means, said arithmetic operation means, said branching means and said queue buffer means may be connected, one to the next in an order as listed to form a data path; and timer control means, connected to said data path, for effecting time control processing by introducing a timer packet into said data path at a predetermined time, and comparing a time value content of said received timer packet with a preset time constant storage value, said timer control means being described by a data-flow graph.

9. A control processor including a data flow machine adapted to operate on a packet having a tag defining a destination node number, and an operation code, and said packet further having data including data indicative of firable or unfirable, said data flow machine comprising:

program storing means for receiving said packet, and for retrieving in response to said destination node number a next destination node number, an operation code, and a selection code which taken together define a new tag, and for replacing said tag in said packet with said new tag;

firing process means for receiving said packet from said program storing means, for judging whether there is a stored partner packet with which said packet received from said program storing means may form a pair of partner packets, said pair having a first term and a second term of dyadic operands that render said pair of partner packets firable, and for storing said packet if unfirable, and for sending said dyadic operands together with said tags if firable;

arithmetic operation means for receiving said dyadic operands from said firing process means, and for executing an arithmetic operation by operation codes contained in said tags;

branching means, having an input and two outputs, for branching packets;

joining means, having two inputs and one output, for making packets confluent; and queue buffer means for queuing packets;

wherein said joining means, said program storing means, said firing process means, said arithmetic operation means, said branching means and said queue buffer means are connected, one to the next in an order as listed to form a data path; and timer control means for effecting time control processing by providing, within said control processor; (a) a first timer function described by a first data flow graph actualized by a program; or (b) a second timer function described by a second data flow graph, including reading means for reading an actual time value from a first timer packet, said reading initiated by a process code within a second timer packet; or (c) a third timer function actualized by using a third timer packet inputted, from outside said data flow machine, at a predetermined timing, said third timer function described by a third data flow graph.

10. A control processer, including a CPU and a data flow machine, said data flow machine adapted to operate on a packet, said packet having data and a tag, said data having instructions, said tag including a destination code, comprising:

junction means, including a first input and a second input and an output, for receiving a first packet from said CPU via said first input, for receiving a second packet via said second input, and for outputting a third packet via said output;

program storing means including input means for receiving from the output of the junction means said third packet, for reading from said third packet a third destination code and a third data, for retrieving a stored program, and for using said stored program to create a new destination code in accordance with instructions in said third data, said program storing means further including means for outputting a fourth packet, said fourth packet including a fourth data containing at least a portion of said third data, and a fourth tag including said new destination code;

firing process means, including input means for receiving from the output means of the program storing means said fourth packet, for forming a pair of packets by retrieving a previously stored partner packet associated with said fourth packet, said firing process means including output means for outputting information derived from said pair of packets as an arithmetic packet;

arithmetic operation means, including input means for receiving from the output means of the firing process means said arithmetic packet, for executing an arithmetic operation in accordance with instructions within said arithmetic packet, said arithmetic operation means further including output means for outputting an arithmetic result packet;

branching means, including a first output, a second output, and input means for receiving from the output means of said arithmetic operation means said arithmetic result packet, for outputting said arithmetic result packet in accordance with instructions in said arithmetic result packet, either via said first output of said branching means to said CPU or via said second output of said branching means;

queue buffer means connected between said second output of said branching means and said second input of said junction means, for receiving said arithmetic result packet from said second output of said branching means, and for outputting said arithmetic result packet to said second input of said junction means, such that a packet circulate around a data path;

means for creating a timer packet and for inserting said timer packet onto said data path via said junction means; and timer control means, having a loop path connected to said data path, for (i) receiving said timer packet from said data path, (ii) circulating said timer packet around said loop path, (iii) incrementing a loop count value in said timer packet, (iv) comparing said loop count value with a stored constant loop count, (v) switching said time packet to repeat functions (ii)-(v) while said loop count value is less than said stored constant loop count, and outputting said timer packet to said data path when said loop count value equals said stored constant loop count;

whereby time control is exercised by a timer function within said data flow machine, and the timer function is actualized by a program described by a data-flow graph.

11. A control processer, including a CPU and a data flow machine, said data flow machine adapted to operate on a packet, said packet having data and a tag, said data having instructions, said tag including a destination code, comprising:

junction means, including a first input and a second input and an output, for receiving a first packet from said CPU via said first input, for receiving a second packet via said second input, and for outputting a third packet via said output;

program storing means including input means for receiving from the output of the junction means said third packet, for reading from said third packet a third destination code and a third data, for retrieving a stored program, and for using said stored program to create a new destination code in accordance with instructions in said third data, said program storing means further including means for outputting a fourth packet, said fourth packet including a fourth data containing at least a portion of said third data, and a fourth tag including said new destination code;

firing process means, including input means for receiving from the output means of the program storing means said fourth packet, for forming a pair of packets by retrieving a previously stored partner packet associated with said fourth packet, said firing process means including output means for outputting information derived from said pair of packets as an arithmetic packet;

arithmetic operation means, including input means for receiving from the output means of the firing process means said arithmetic packet, for executing an arithmetic operation in accordance with instructions within said arithmetic packet, said arithmetic operation means further including output means for outputting an arithmetic result packet;

branching means, including a first output, a second output and input means for receiving from the output means of said arithmetic operation means said arithmetic result packet, for outputting said arithmetic result packet in accordance with instructions in said arithmetic result packet, either via said first output of said branching means to said CPU or via said second output of said branching means;

queue buffer means connected between said second output of said branching means and said second input of said junction means, for receiving said arithmetic result packet from said second output of said branching means, and for outputting said arithmetic result packet to said second input of said junction means, such that a packet move along a data path;

means for creating a timer packet and for inserting said timer packet onto said data path; and timer control means, connected to said data path, having a set time data portion for adding an actual time value to a timer packet, and a read and compare portion for receiving a timer packet from said data path and comparing said actual time value with a previously stored time value;

whereby time control is exercised by a timer function within said data flow machine, and the timer function is actualized by a program described by a data-flow graph.

12. A control processor according to claim 11, wherein said read and compare portion of said timer control means is connected in parallel to said arithmetic operation means.

13. A control processor according to claim 11, wherein said read and compare portion of said timer control means is connected in parallel to said queue buffer means.

14. A control processor according to claim 13, wherein said set time data portion is located external to said data flow machine.

15. A control processor according to claim 11, wherein said read and compare portion of said timer control means is connected in parallel to said program storing means.

16. A control processor according to claim 11, wherein said program storing means, said arithmetic operation means and said read and compare portion of said timer control are connected in parallel.

17. A control processer, including a CPU and a data flow machine, said data flow machine adapted to operate on a packet, said packet having data and a tag, said data having instructions, said tag including a destination code, comprising:

junction means, including a first input and a second input and an output, for receiving a first packet from said CPU via said first input, for receiving a second packet via said second input, and for outputting a third packet via said output;

program storing means including input means for receiving from the output of the junction means said third packet, for reading from said third packet a third destination code and a third data, for retrieving a stored program, and for using said stored program to create a new destination code in accordance with instructions in said third data, said program storing means further including means for outputting a fourth packet, said fourth packet including a fourth data containing at least a portion of said third data, and a fourth tag including said new destination code;

firing process means including input means for receiving from the output means of the program storing means said fourth packet, for forming a pair of packets by retrieving a previously stored partner packet associated with said fourth packet, said timing process means including output means for outputting information derived from said pair of packets as an arithmetic packet;

arithmetic operation means, including input means for receiving from the output means of the firing process means said arithmetic packet, for executing an arithmetic operation in accordance with instructions within said arithmetic packet, said arithmetic operation means further including output means for outputting an arithmetic result packet;

branching means, including a first output, a second output and input means, for receiving from the output means of said arithmetic operation means said arithmetic result packet, for outputting said arithmetic result packet in accordance with instructions in said arithmetic result packet, either via said first output of said branching means to said CPU or via said second output of said branching means;

queue buffer means connected between said second output of said branching means and said second input of said junction means, for receiving said arithmetic result packet from said second output of said branching means, and for outputting said arithmetic result packet to said second input of said junction means, such that a packet move along a data path; and means for creating a timer packet and for introducing said timer packet to said junction means at a predetermined time and comparing a time value content of said timer packet with a preset time value;

whereby time control is exercised by a timer function, and the timer function is described by a data flow graph.

18. A control processer, including a CPU and a data flow machine, said data flow machine adapted to operate on a packet, said packet having data and a tag, said data having instructions, said tag including a destination code, comprising:

junction means, including a first input and a second input and an output, for receiving a first packet from said CPU via said first input, for receiving a second packet via said second input, and for outputting a third packet via said output;

program storing means including input means for receiving from the output of the junction means said third packet, for reading from said third packet a third destination code and a third data, for retrieving a stored program, and for using said stored program to create a new destination code in accordance with instructions in said third data, said program storing means further including means for outputting a fourth packet, said fourth packet including a fourth data containing at least a portion of said third data, and a fourth tag including said new destination code;

firing process means, including input means for receiving from the output means of the program storing means said fourth packet, for forming a pair of packets by retrieving a previously stored partner packet associated with said fourth packet, said firing process means including output means for outputting information derived from said pair of packets as an arithmetic packet;

arithmetic operation means, including input means for receiving from the output means of the firing process means said arithmetic packet, for executing an arithmetic operation in accordance with instructions within said arithmetic packet, said arithmetic operation means further including output means for outputting an arithmetic result packet;

branching means, including a first output, a second output and input means for receiving from the output means of said arithmetic operation means said arithmetic result packet, for outputting said arithmetic result packet in accordance with instructions in said arithmetic result packet, either via said first output of said branching means to said CPU or via said second output of said branching means;

queue buffer means connected between said second output of said branching means and said second input of said junction means, for receiving said arithmetic result packet from said second output of said branching means, and for outputting said arithmetic result packet to said second input of said junction means, such that a packet move along a data path;

means for creating a timer packet and for inserting said timer packet onto said data path; and timer control means for effecting time control processing by using a timer function operating on said timer packet within said data flow machine, said timer function described by a data flow graph and actualized by a program.

19. A control processer, including a CPU and a data flow machine, said data flow machine adapted to operate on a packet, said packet having data and a tag, said data having instructions, said tag including a destination code, comprising:

junction means, including a first input and a second input and an output, for receiving a first packet from said CPU via said first input, for receiving a second packet via said second input, and for outputting a third packet via said output;

program storing means including input means for receiving from the output of the junction means said third packet, for reading from said third packet a third destination code and a third data, for retrieving a stored program, and for using said stored program to create a new destination code in accordance with instructions in said third data, said program storing means further including means for outputting a fourth packet, said fourth packet including a fourth data containing at least a portion of said third data, and a fourth tag including said new destination code;

firing process means, including input means for receiving from the output means of the program storing means said fourth packet, for forming a pair of packets by retrieving a previously stored partner packet associated with said fourth packet, said firing process means including output means for outputting information derived from said pair of packets as an arithmetic packet;

arithmetic operation means, including input means for receiving from the output means of the firing process means said arithmetic packet, for executing an arithmetic operation in accordance with instructions within said arithmetic packet, said arithmetic operation means further including output means for outputting an arithmetic result packet;

branching means, including a first output, a second output and input means for receiving from the output means of said arithmetic operation means said arithmetic result packet, for outputting said arithmetic result packet in accordance with instructions in said arithmetic result packet, either via said first output of said branching means to said CPU or via said second output of said branching means;

queue buffer means connected between said second output of said branching means and said second input of said junction means, for receiving said arithmetic result packet from said second output of said branching means, and for outputting said arithmetic result packet to said second input of said junction means, such that a packet move along a data path;

means for creating a timer packet and for inserting said timer packet onto said data path;

timer control means for effecting time control processing, including a timer function having means, within said data machine, for reading an actual time value from said timer packet, and for initiating the reading of such actual time value by reading a process code from said timer packet, the timer function described by a data flow graph and actualized by a program.

20. A control processer, including a CPU and a data flow machine, said data flow machine adapted to operate on a packet, said packet having data and a tag, said data having instructions, said tag including a destination code, comprising:

junction means, including a first input and a second input and an output, for receiving a first packet from said CPU via said first input, for receiving a second packet via said second input, and for outputting a third packet via said output;

program storing means including input means for receiving from the output of the junction means said third packet, for reading from said third packet a third destination code and a third data, for retrieving a stored program, and for using said stored program to create a new destination code in accordance with instructions in said third data, said program storing means further including means for outputting a fourth packet, said fourth packet including a fourth data containing at least a portion of said third data, and a fourth tag including said new destination code;

firing process means, including input means for receiving from the output means of the program storing means said fourth packet, for forming a pair of packets by retrieving a previously stored partner packet associated with said fourth packet, said firing process means including output means for outputting information derived from said pair of packets as an arithmetic packet;

arithmetic operation means, including input means for receiving from the output means of the firing process means said arithmetic packet, for executing an arithmetic operation in accordance with instructions within said arithmetic packet, said arithmetic operation means further including output means for outputting an arithmetic result packet;

branching means, including a first output, a second output and input means for receiving from the output means of said arithmetic operation means said arithmetic result packet, for outputting said arithmetic result packet in accordance with instructions in said arithmetic result packet, either via said first output of said branching means to said CPU or via said second output of said branching means;

queue buffer means connected between said second output of said branching means and said second input of said junction means, for receiving said arithmetic result packet from said second output of said branching means, and for outputting said arithmetic result packet to said second input of said junction means, such that a packet move along a data path;

means for creating a timer packet and for inserting said timer packet onto said data path;

timer control means for effecting time control processing including a timer function, within said data flow machine, having means for receiving a timer packet from outside said data flow machine at an arbitrary predetermined time and synchronizing such timer packet with said data flow machine, the timer function described by a data flow graph and actualized by a program.

21. A process control method, for use in a system including a data flow machine with a closed data path having a memory and an arithmetic operation means and containing a stream of circulating packets, each of the packets including data and a tag, the system further including timer packet generating means, a CPU for generating new packets, and a loop path, the method comprising the steps of:

injecting into the stream of circulating packets a new packet generated by the CPU;

reading from one of the stream of circulating packets a destination node number indicated by the tag, and the data of the one of the stream of circulating packets;

replacing the tag of the one of the stream of circulating packets with one containing a new destination node number based on the destination node number indicated by the tag and the data of the one of the stream of circulating packets;

storing in the memory another of the stream of circulating packets;

forming a packet pair when a first operand indicated by the tag of the one of the stream of circulating packets and a second operand indicated by the tag of the other of the stream of circulating packets form a dyadic pair or operands for operation indicated by the tag of the one and the other of the stream of circulating packets;

creating an arithmetic packet based on the operation and the dyadic pair or operands;

executing in the arithmetic operation means the operation of the arithmetic packet on the dyadic pair of operands, so as to created an arithmetic result packet;

injecting into the stream of circulating packets the arithmetic result packet;

injecting into the stream of circulating packets a timer packet created by the timer packet generating means; and exercising time control by:
(i) transferring the timer packet from the data path to said loop path,
(ii) circulating the timer packet around the loop path,
(iii) incrementing a loop count value in the timer packet,
(iv) comparing the loop count value with a stored constant loop count,
(v) repeating steps (ii)-(v) while the loop count value is less than the stored constant loop count, and otherwise outputting the timer packet to the data path.

22. A process control method, for use in a system including a data flow machine with a closed data path having a memory and an arithmetic operation means and containing a stream of circulating packets, each of the packets including data and a tag, the system further including timer packet generating means, and a CPU for generating new packets, the method comprising the steps of:

injecting into the stream of circulating packets a new packet generated by the CPU;

reading from one of the stream of circulating packets a destination node number indicated by the tag, and the data of the one of the stream of circulating packets;

replacing the tag of the one of the stream of circulating packets with one containing a new destination node number based on the destination node number indicated by the tag and the data of the one of the stream of circulating packets;

storing in the memory another of the stream of circulating packets;

forming a packet pair when a first operand indicated by the tag of the one of the stream of circulating packets and a second operand indicated by the tag of the other of the stream of circulating packets form a dyadic pair or operands for operation indicated by the tag of the one and the other of the stream of circulating packets;

creating an arithmetic packet based on the operation and the dyadic pair or operands;

executing in the arithmetic operation means the operation of the arithmetic packet on the dyadic pair of operands, so as to created an arithmetic result packet;

injecting into the stream of circulating packets the arithmetic result packet;

injecting into the stream of circulating packets a timer packet created by the timer packet generating means;

adding an actual time value to the timer packet; and exercising time control by comparing said actual time value with a previously stored time value.

23. A process control method, for use in a system including a data flow machine with a closed data path having a memory and an arithmetic operation means and containing a stream of circulating packets, each of the packets including data and a tag, the system further including timer packet generating means, and a CPU for generating new packets, the method comprising the steps of:

injecting into the stream of circulating packets a new packet generated by the CPU;

reading from one of the stream of circulating packets a destination node number indicated by the tag, and the data of the one of the stream of circulating packets;

replacing the tag of the one of the stream of circulating packets with one containing a new destination node number based on the destination node number indicated by the tag and the data of the one of the stream of circulating packets;

storing in the memory another of the stream of circulating packets;

forming a packet pair when a first operand indicated by the tag of the one of the stream of circulating packets and a second operand indicated by the tag of the other of the stream of circulating packets form a dyadic pair or operands for operation indicated by the tag of the one and the other of the stream of circulating packets;

creating an arithmetic packet based on the operation and the dyadic pair or operands;

executing in the arithmetic operation means the operation of the arithmetic packet on the dyadic pair of operands, so as to created an arithmetic result packet;

injecting into the stream of circulating packets the arithmetic result packet;

injecting at a predetermined time into the stream of circulating packets a timer packet created by the timer packet generating means; and comparing a time value content of said timer packet with a preset time value.

24. A process control method, for use in a system including a CPU and a data flow machine with a closed data path having a memory and an arithmetic operation means and containing a stream of circulating packets, each of the packets including data and a tag, the system further including timer packet generating means, and a CPU for generating new packets, the method comprising the steps of:

injecting into the stream of circulating packets a new packet generated by the CPU;

reading from one of the stream of circulating packets a destination node number indicated by the tag, and the data of the one of the stream of circulating packets;

replacing the tag of the one of the stream of circulating packets with one containing a new destination node number based on the destination node number indicated by the tag and the data of the one of the stream of circulating packets;

storing in the memory another of the stream of circulating packets;

forming a packet pair when a first operand indicated by the tag of the one of the stream of circulating packets and a second operand indicated by the tag of the other of the stream of circulating packets form a dyadic pair or operands for operation indicated by the tag of the one and the other of the stream of circulating packets;

creating an arithmetic packet based on the operation and the dyadic pair or operands;

executing in the arithmetic operation means the operation of the arithmetic packet on the dyadic pair of operands, so as to created an arithmetic result packet;

injecting into the stream of circulating packets the arithmetic result packet;

injecting into the stream of circulating packets a timer packet created by the timer packet generating means; and exercising time control by using a timer function operating on the timer packet within said data flow machine.

* * * * *